(12) United States Patent
Finnerty

(10) Patent No.: US 10,924,630 B2
(45) Date of Patent: Feb. 16, 2021

(54) USING MIDDLEWARE FOR GENERATING VECTOR GRAPHICS IMAGED SECURITY DOCUMENTS

(71) Applicant: Hydragraphix LLC, Providence, RI (US)

(72) Inventor: Fred W. Finnerty, Dawsonville, GA (US)

(73) Assignee: Hydragraphix, Providence, RI (US)

( * ) Notice: Subject to any disclaimer, the term of this patent is extended or adjusted under 35 U.S.C. 154(b) by 0 days.

(21) Appl. No.: 16/717,569

(22) Filed: Dec. 17, 2019

(65) Prior Publication Data

US 2020/0204703 A1 Jun. 25, 2020

Related U.S. Application Data

(63) Continuation of application No. 15/769,736, filed as application No. PCT/US2016/058085 on Oct. 21, 2016, now Pat. No. 10,516,800.

(Continued)

(51) Int. Cl.
*H04N 1/32* (2006.01)
*B41M 3/14* (2006.01)
(Continued)

(52) U.S. Cl.
CPC ....... *H04N 1/32272* (2013.01); *A63F 3/0655* (2013.01); *A63F 3/0665* (2013.01);
(Continued)

(58) Field of Classification Search
CPC .. H04N 1/32144–32352; H04N 1/4486; G06F 3/1222; G06F 3/1238;
(Continued)

(56) References Cited

U.S. PATENT DOCUMENTS 5,569,512 A 10/1996 Brawner et al.
5,704,647 A 1/1998 Desbiens
(Continued)

FOREIGN PATENT DOCUMENTS

EP 1394752 A2 3/2004

OTHER PUBLICATIONS

"Extended European Search Report", EP 16858268.2 (5 pages), dated Apr. 17, 2019.

(Continued)

*Primary Examiner* — Scott A Rogers
(74) *Attorney, Agent, or Firm* — Neal, Gerber & Eisenberg LLP

(57) ABSTRACT

A method is provided of digitally imaging a secure portion and a non-secure portion of scratch-off-coating protected documents of at least one game using middleware. The method includes: (a) generating the secure variable indicia in non-vector raster format; (b) generating vector graphics to be imaged on physical document locations; (c) assigning the secure variable indicia in a non-vector raster format to documents in and shuffling the documents throughout a print run; and (d) linking via middleware the secure variable indicia in the non-vector raster format to associated vector graphics variable indicia to be digitally imaged on the documents and to generate vector graphics-formatted data for each document in the print run. The secure variable indicia assignment and shuffling are executed by non-vector raster game generation software output that is reinterpreted by the middleware to produce related vector graphic output for the secure variable indicia.

20 Claims, 24 Drawing Sheets

Related U.S. Application Data

(60) Provisional application No. 62/244,473, filed on Oct. 21, 2015.

(51) Int. Cl.

| | | |
|---|---|---|
| *G06K 15/02* | (2006.01) | |
| *G06K 15/00* | (2006.01) | |
| *G06F 3/12* | (2006.01) | |
| *H04N 1/44* | (2006.01) | |
| *G09C 5/00* | (2006.01) | |
| *G07C 15/00* | (2006.01) | |
| *H04L 9/06* | (2006.01) | |
| *H04L 9/08* | (2006.01) | |
| *A63F 3/06* | (2006.01) | |
| *B41M 5/00* | (2006.01) | |
| *G07F 17/32* | (2006.01) | |
| *B41F 19/00* | (2006.01) | |
| *B41J 2/04* | (2006.01) | |

(52) U.S. Cl.
CPC ............ *B41M 3/14* (2013.01); *B41M 5/0047* (2013.01); *G06F 3/1222* (2013.01); *G06F 3/1238* (2013.01); *G06F 3/1243* (2013.01); *G06F 3/1298* (2013.01); *G06K 15/1834* (2013.01); *G06K 15/1855* (2013.01); *G06K 15/4095* (2013.01); *G07C 15/00* (2013.01); *G07C 15/005* (2013.01); *G07C 15/006* (2013.01); *G07F 17/329* (2013.01); *G09C 5/00* (2013.01); *H04L 9/0618* (2013.01); *H04L 9/0656* (2013.01); *H04L 9/0863* (2013.01); *H04L 9/0869* (2013.01); *H04N 1/32229* (2013.01); *H04N 1/4486* (2013.01); *A63F 2003/066* (2013.01); *B41F 19/007* (2013.01); *B41J 2/04* (2013.01); *B41P 2200/12* (2013.01)

(58) Field of Classification Search
CPC . G06F 3/1243; G06F 3/1298; G06K 15/1834; G06K 15/1855; G06K 15/4095; H04L 9/0618; H04L 9/0656; H04L 9/0863; H04L 9/0869; A63F 3/0655; A63F 2003/066; G07F 17/329; B41M 3/14; B41M 5/0047; G09C 5/00
See application file for complete search history.

(56) References Cited

U.S. PATENT DOCUMENTS

| | | |
|---|---|---|
| 7,720,421 B2 | 5/2010 | Snyder |
| 8,074,570 B2 | 12/2011 | Grotkowski et al. |
| 8,240,797 B2 * | 8/2012 | Haas .................. B41J 2/08 347/9 |
| 8,342,576 B2 | 1/2013 | Eschbach et al. |
| 8,478,981 B2 | 7/2013 | Khan et al. |
| 9,088,735 B2 * | 7/2015 | Altfeder .............. G06T 1/0028 |
| 9,405,984 B2 | 8/2016 | Irwin et al. |
| 10,008,074 B2 | 6/2018 | Martineck |
| 10,129,429 B2 * | 11/2018 | Samtani ............. H04N 19/467 |
| 10,147,283 B2 | 12/2018 | Weil et al. |
| 10,183,213 B2 * | 1/2019 | Irwin, Jr. ............. B42D 25/27 |
| 10,185,522 B2 | 1/2019 | Irwin et al. |
| 10,419,636 B2 * | 9/2019 | Goldsmith ........... G06F 3/1243 |
| 2005/0050344 A1 | 3/2005 | Hull et al. |
| 2007/0210514 A1 | 9/2007 | Ellis |
| 2008/0287176 A1 | 11/2008 | Bennett |
| 2009/0263583 A1 | 10/2009 | Mantell et al. |
| 2010/0253063 A1 | 10/2010 | Skogster |
| 2012/0061951 A1 | 3/2012 | Upshaw et al. |
| 2012/0267888 A1 | 10/2012 | Behm et al. |
| 2013/0027739 A1 | 1/2013 | Gilg |
| 2014/0355069 A1 | 12/2014 | Caton et al. |
| 2014/0356537 A1 | 12/2014 | Tyagi et al. |
| 2018/0315352 A1 | 11/2018 | Irwin et al. |

OTHER PUBLICATIONS

"Extended European Search Report", EP 16858272.4 (8 pages), dated Apr. 24, 2019.
"Extended European Search Report", EP 16858285.6 (5 pages), dated May 21, 2019.
"International Preliminary Report on Patentability", PCT/US2016/058085 (6 pages), dated May 3, 2018.
"International Search Report and Written Opinion", PCT/US2016/058085 (15 pages), dated Jan. 12, 2017.
"Office Action with Translation", CN201680075007.7 (7 pages), dated Jul. 31, 2019.
Shannon, C. E., "Communication Theory of Secrecy Systems", Bell Labs Technical Journal, vol. 28, No. 4, pp. 656-715 (1945).

* cited by examiner

```
                        225

%!PS

%define colors
    /black {1 0 0 1 setcmykcolor} def %100 percent cyan and black
    /red {0 1 1 0 setcmykcolor} def   %100 percent magenta and
226 yellow %define page upper left to be 0,0 scaled in inches
    /startPage
    {
            0 792 translate %top of page is zero
            72 -72.0 scale %bottom of page is positive, not negative
227 } def %define font
    /PlayingCards findfont [.35 0 0 -.35 0 0] makefont setfont 228 %define cards                230
    /jc {black (a) showCard} def      /js {black (n) showCard}
    def                               def
    /qc {black (b) showCard} def      /qs {black (o) showCard}
    def                               def
    /kc {black (c) showCard} def      /ks {black (p) showCard}
229 def                               def
    /ac {black (d) showCard} def      /as {black (q) showCard}
231 def                          233 def
    /2c {black (e) showCard} def      /2s {black (r) showCard}
    def                               def
    ...
    /jh {red (A) showCard} def        /jd {red (N) showCard} def
232 /qh {red (B) showCard} def        /qd {red (O) showCard} def
    /kh {red (C) showCard} def        /kd {red (P) showCard} def
    /ah {red (D) showCard} def        /ad {red (Q) showCard} def
234
```

%define page layout 3 down, 2 across
           /pageLayout{
                 [
  251              [0.000 0.000] [0.000 2.000] [0.000 4.000]
                   [4.000 0.000] [4.000 2.000] [4.000 4.000]
                 ]
           }def %define pattern layout 3x3
           /patLayout{
  252            [
                   [0.0 0.5] [0.5 0.5] [1.0 0.5]
                   [0.0 1.0] [0.5 1.0] [1.0 1.0]
                   [0.0 1.5] [0.5 1.5] [1.0 1.5]
                 ]
           }def %define counters
           /ticketNum 0 def
           /patNum 0 def
  253
           %macro to start ticket
           /startTicket
           {
                 pageLayout ticketNum get cvx exec moveto
                 ticketNum 5 eq {/ticketNum 0 def } {/ticketNum ticketNum 1 add def }
           ifelse
  254            /patNum 0 def
           }def %macro to show card
           /showCard
           {
                 gsave
  255            patLayout patNum get cvx exec rmoveto
                 show grestore
                 /patNum patNum 1 add def
           } def 256      %data
           startPage
           startTicket ad 2d 3d 4d 5d 6d 7d 8d 9d
           startTicket ac 2c 3c 4c 5c 6c 7c 8c 9c
           startTicket ah 2h 3h 4h 5h 6h 7d 8h 9h
           startTicket as 2s 3s 4s 5s 6s 7s 8s 9s
           startTicket ad 2c 3h 4s 5d 6c 7h 8s 9d
           startTicket kd js 9h 3s 3c 5h ad 4c 7c

FIG. 10
```

```
%!PS
/outfile (%stdout) (w) file def        ~301

/datain(Now is the time for all good men to come to the aid of their country.)
def                    ~302
/datakey
(fty8986t11cxzzuyp02fhxmsqa47jo0olmbcwf32gmcxsaglp09b5vfefyjzqczbyiphbudt56ycxt)
def
/holdkey datakey def /over {1 index} def
/rot {3 -1 roll} def
                ~303
/onetimepad {
    dup length 0 eq { return } if
    dup length 1 sub 0 1 rot {
        over over get do_xor 2 index 3 1 roll put
    } for
} def /do_xor {
    datakey 0 get xor
    /datakey datakey dup length 1 sub 1 exch getinterval def
} def %dump input data in hex     ~304
datain ==
datain onetimepad
/dataenc exch def
%dump encrypted data in hex
outfile dataenc writehexstring
/datakey holdkey def
%dump decrypted data in hex
dataenc onetimepad ==
```

FIG. 13

```
datain onetimepad   ~310

GS>%dump encrypted data in hex
GS>
GS>outfile dataenc writehexstring
281b0e18504b16000409430c13171059165f404609140153160e5b534a0255014c190d4314095e57
47190c580709024c11595d42Sa1046110e1c030851001517171d02114c dataenc onetimepad   ~311

(Now is the time for all good men to come to the aid of their country.)
```

FIG. 14

```
%define page upper left to be 0,0 scaled in inches
/startPage                                                  ← 325
{
    0 792 translate %top of page is zero
    72 -72.0 scale %bottom of page is positive, not negative
    2 2 scale
} def %imaged from 1 single font character                        ← 327
/7sOneFont {
    /PlayingCards findfont [.35 0 0 -.35 0 0] makefont setfont
    (W) show
} def %composed from characters from multiple fonts               ← 328
/7sMultiFont {
    /Border findfont [.155 0 0 -.155 0 0] makefont setfont
    gsave 0.01 0.0 rmoveto (qr)show grestore
    gsave 0.01 0.14 rmoveto (xv)show grestore
    gsave 0.01 0.28 rmoveto (ts)show grestore /Helvetica-Bold findfont [.16 0 0 -.16 0 0] makefont setfont
    gsave 0.12 -0.005 rmoveto (7)show grestore /Symbol findfont [.25 0 0 -.25 0 0] makefont setfont
    gsave 0.07 0.15 rmoveto (\252)show grestore /Helvetica-Bold findfont [.07 0 0 -.08 0 0] makefont setfont
    gsave 0.05 0.25 rmoveto (SEVEN)show grestore
    %/PlayingCards findfont [.35 0 0 -.35 0 0] makefont setfont
    %(w) show
} def
```

FIG. 16

```
%vector box and font the rest font characters
/7sMixed {
    gsave
    %1 setlinecap
    %1 setlinejoin
    %1 setmiterlimit
    0.02 -0.14 rmoveto
    0.30 0 rlineto
    0 0.42 rlineto
    -0.30 0 rlineto
    .01 setlinewidth
    closepath stroke grestore /Helvetica-Bold findfont [.16 0 0 -.16 0 0] makefont setfont
    gsave 0.12 -0.005 rmoveto (7)show grestore /Symbol findfont [.25 0 0 -.25 0 0] makefont setfont
    gsave 0.07 0.15 rmoveto (\252)show grestore /Helvetica-Bold findfont [.07 0 0 -.08 0 0] makefont setfont
    gsave 0.05 0.25 rmoveto (SEVEN)show grestore
    %/PlayingCards findfont [.35 0 0 -.35 0 0] makefont setfont
    %(w) show
} def
```
― 329

FIG. 16 (Cont.)

```
% all vector                    ← 351         ← 350
/7sVector {
    gsave                          ← 352
    currentpoint translate
    0.01 0.01 scale
    0 2.5918 moveto
    0 1.15234 1.15186 0 2 .59131 0 curveto
    29.5161 0 lineto
    30.9561 0 32.1079 1.15234 32.1079 2.5918 curveto
    32.1079 43.7705 lineto
    32.1079 45.2109 30.9561 46.3623 29.5161 46.3623 curveto
    2.59131 46.3623 lineto
    1.15186 46.3623 0 45.2109 0 43.7705 curveto
    0 2.5918 lineto
    closepath
    0 0 0 1 setcmykcolor
    fill
    1.07959 43.7705 moveto
    1.07959 44.5986 1.76367 45.2832 2.59131 45.2832 curveto
    29.5161 45.2832 lineto
    30.3442 45.2832 31.0278 44.5986 31.0278 43.7705 curveto
    31.0278 2.5918 lineto
    31.0278 1.76367 30.3442 1.08008 29.5161 1.08008 curveto
    2.59131 1.08008 lineto
    1.76367 1.08008 1.07959 1.76367 1.07959 2.5918 curveto
    1.07959 43.7705 lineto
    closepath
    ...                           ← 354
    fill
    23.2891 36.4277 moveto
    24.8369 36.4277 lineto
    26.5283 41.1426 lineto
    26.6006 41.1426 lineto
    26.6006 36.4277 lineto
    27.6802 36.4277 lineto
```

FIG. 17

```
            27.6802 42.4746 lineto
            26.0244 42.4746 lineto
            24.4409 38.0117 lineto
            24.3687 38.0117 lineto
            24.3687 42.4746 lineto
            23.2891 42.4746 lineto
            23.2891 36.4277 lineto
            closepath
            fill
            grestore
            }def
startPage
/Helvetica findfont [.35 0 0 -.35 0 0] makefont setfont
.2 .2 moveto (Glyph Methods) show .5 1.0 moveto 7sOneFont
.5 1.5 moveto 7sMultiFont
.5 2.0 moveto 7sMixed
.5 2.5 moveto 7sVector showpage
```
↗ 355

USING MIDDLEWARE FOR GENERATING VECTOR GRAPHICS IMAGED SECURITY DOCUMENTS

CROSS-REFERENCE TO RELATED APPLICATION

This application is a continuation of copending U.S. patent application Ser. No. 15/769,736 filed Apr. 19, 2018, which, in turn, is a Section 371 of International Application No. PCT/US2016/058085, filed Oct. 21, 2016, which was published in the English language on Apr. 27, 2017 under International Publication No. WO 2017/070454 A1. The disclosures of both of these applications are incorporated herein by reference.

This application claims the benefit of U.S. Patent Application No. 62/244,473, filed Oct. 21, 2015, the disclosure of which is hereby incorporated herein by reference in its entirety.

FIELD OF THE INVENTION

The present invention relates generally to documents, such as lottery tickets, having secure variable indicia under a Scratch-Off-Coating (SOC), and more particularly to methods and systems for imaging both secure variable indicia and non-secure display portions (i.e., not covered by SOC) of such documents simultaneously with variable imager(s). Specifically, this innovation resolves the problem of producing high quality instant or scratch-off tickets with off-the-shelf digital printers used to image both the secure (i.e., variable indicia) and non-secure (e.g., display, back and overprint) areas of the ticket or document without compromising the security of the hidden secure variable indicia. With this innovation, secure lottery tickets and other documents can be economically produced in smaller volumes created by a central secure server cluster and distributed for printing on demand to one or more digital printers that may be geographically separated.

BACKGROUND

Lottery games have become a time honored method of raising revenue for state and federal governments the world over. Traditional scratch-off and draw games have evolved over decades, supplying increasing revenue year after year. However, after decades of growth, the sales curves associated with traditional games seem to be flattening out with median sales per capita experiencing a sharp decline. This flattening of lottery sales growth is typically attributed to a fixed base of consumers that routinely purchase lottery products with very few new consumers choosing to participate in the lottery marketplace. Various analyses of state lottery sales data tend to support the hypothesis that lotteries rely heavily on an existing consumer base and more specifically on lottery "super users." Three states (Rhode Island, South Dakota and Massachusetts) had 2014 lottery sales that topped $700 per capita. While ten states had per capita sales below $100, per capita sales for all state lotteries averaged almost $250. Demographically speaking, this existing base of lottery consumers is aging with younger consumers showing very little interest in participating in existing lottery offerings. Thus, the potential for ever-increasing lottery sales is increasingly problematic with the existing fixed base of consumers saturated. Consequently, both lotteries and their service providers are presently searching for more marketable forms of gaming that would appeal to a broader consumer base.

In addition to flattening sales, a static lottery consumer base is often cited when state legislatures debate whether lotteries represent a form of exploitation of problem gamblers. For example, "Stop Predatory Gambling", which advocates an end to state-sponsored gambling recently stated, "State lotteries have a business model that's based on getting up to 70 to 80 percent of their revenue from 10 percent of the people that use the lottery . . . ." In Minnesota, a pending bipartisan bill would require 25% of lottery billboards to be dedicated to a warning about the odds of winning and gambling addiction, as well as information on where problem gamblers can seek help.

This phenomenon of a relatively small percentage of the population being responsible for a large majority of lottery sales is partially due to the commoditization of lottery tickets by ticket manufacturers. In the past decade, manufacturers of instant lottery tickets have developed techniques, which enabled stationary process color process images to be printed as display and on top of the scratch-off layers. This conventional printing method implies display and overprint images are stationary and do not change from one printing impression to the next during a single printing run—e.g., U.S. Pat. Nos. 5,569,512 and 5,704,647.

Lottery ticket production involves large volumes of variable information when designing the play styles and prize payout functions of the games; it is impractical to meet these requirements using conventional plate printing techniques such as flexographic printing to produce game play and validation information in the security areas (under the SOC) of tickets. Far too many plate changes would be required to produce the vast amount of secure variable indicia in more than two colors in the security areas to complete a run that consisted of large volumes of tickets, rendering plate printing for this purposes not viable. Thus, to date almost all lottery ticket variability has been confined to monochromatic variable indicia or two-spot color imaged by drop-on-demand ink jet with the display and overprints being (mostly) static from game to game. This, in turn, confines the instant lottery ticket product to high-volume print runs with very little experimentation in terms of theming as printed on the ticket and gaming experience due to the need to ensure that the vast majority of print runs sell out to be economically feasible.

Another reason for the high-volume, fixed plate printing manufacturing techniques typical of instant tickets is the lottery industry paradigm of non-failure production. With this paradigm any misprinted tickets should be identified during manufacturing and eliminated before they are delivered to the lottery and their retailers. If the lottery ticket manufacturer makes errors or omissions, they may be held liable, to a limited degree, for payment of prizes due to over redemption of lottery tickets. Thus, the justifiable requirements to achieve virtually zero errors have the unintended consequence of discouraging the amount of variable data on lottery tickets. As a result, manufacturers confine variability to indicia with display and overprint portions using fixed printing plates, which have a much lower error rate than any other type of imager.

An additional metric driving fixed plate printing of instant lottery tickets with small amounts of variable monochromatic indicia and barcode data are the high volumes of data required for variable process color printing of indicia. Present lottery instant ticket secure variable indicia printing technology employs one-bit (i.e., ink on or off) raster imaging at 240 dpi (dots per inch), while modern four-color digital imaging typically offers 8-bit-per-color intensity (i.e., 32-bits total per process color dot for Cyan, Magenta, Yellow, and blacK—CMYK) with resolutions in excess of 800 dpi. The amount of data required for four-color indicia printing increases by over 355 times per square inch of printing surface verses monochromatic or spot color. Even by modern computing standards, an increase of over 355 times in the amount of data per variable square inch of instant ticket surface is a challenge to manage when multiplied by typical print run volumes of 10,000,000 to 500,000,000 tickets. If the visible, non-secure display and overprints are imaged in addition to the secure variable indicia, the data handling volumes grow almost exponentially.

The associated digital imager bandwidth required to handle this vast amount of image data further compounds the problem of four-color imaging of lottery tickets and again helps to explain why the industry favors fixed plate printing with only monochromatic variable indicia imaging. For example, assume that instant lottery tickets are printed with variable imaging across a narrow one-foot wide web at a low print speed of 100 FPM (Feet Per Minute). For monochromatic (1-bit) imaging at 240 dpi, a continuous imager data bandwidth of over 103 megabytes-per-minute (about 1.7 MB/second or about 14 megabits-per-second—14 Mbps) would be required to not pause the printing process. By contrast, four-color imaging (i.e., 32-bit at a higher resolution) over the same narrow web width (one foot) and relatively slow speed (100 FPM) will require an aggregate imager bandwidth of almost 37 billion-bytes-per-minute (about 617 MB/second or about 5 billion-bits-per-second—5 Gbps). In comparison, the maximum theoretical bandwidth of Ethernet cable 1000BASE-T (i.e., category 5e cable—the highest standard) is only 1000 Mbps or 1 Gbps.

This very high amount of bandwidth necessary for digitally imaging four-color lottery ticket variable indicia and other areas also becomes problematic in terms of security. Real-time decryption of a continuous stream of approximately 5 Gbps of data (from the example above) can be problematic even when utilizing symmetrical encryption/decryption algorithms optimized for low processor burden (e.g., Blowfish, Advanced Encryption Standard—AES, etc.). Thus, the sensitive win or lose secure variable indicia data (i.e., the data that determine if a given ticket is a winner or loser) would most likely not be encrypted or decrypted ahead of the print run, requiring its cleartext embodiment to be stored in physically secure areas only. This proves problematic for any forms of distributed printing or printing on demand. This, in turn, limits instant ticket print production to secure centralized facilities with "big bang" (i.e., all at once) print runs, since securing cleartext indicia data over distributed printing environments or printing in multiple smaller (more efficient) print runs is too complex to be practical. Aside from bandwidth limitations, traditional drop-on-demand instant lottery ticket imaging does not allow for real time decryption due to limitations inherent in the internal printer machine's markup language.

In addition to security, auditing and validating the vast amount of imager data necessary for a four-color instant ticket print run are other challenging problems. Traditional monochromatic instant ticket imaging using monochromatic or spot color ink drop-on-demand is based on traditional variable indicia fonts created for a specific game, the final output being a raster image file with a resolution of 240 dpi. Tickets printed from this file and portions of the file are typically audited to ensure the game's integrity. Again, with the very high volumes of imager data inherent in four-color or high-resolution imaging, performing audits and verifying data are troublesome—especially in print on demand or distributed printing environments.

While there has been some industry effort to advance instant lottery ticket printing technology with digital imaging (most notably: U.S. Pat. Nos. 7,720,421; 8,074,570; and 8,342,576; and US Application Publication Nos. 2009/0263583; 2010/0253063; 2012/0267888; and 2014/0356537), none of this effort has addressed the problem of dealing with the vast amounts of data associated with four-color instant lottery ticket print runs, much less the more complex problems of secure printing on demand, distributed network printing, ensuring correctly printed variable indicia, and efficiently and securely processing relatively small stylized print runs specifically targeted at differing demographics.

In an attempt to de-commoditize lottery tickets, appeal to a broader base, and increase sales, especially United States lotteries have moved towards producing games with more entertainment value that can be sold at a premium price. Ideally, these games would include process color imaging and should be economically produced in smaller volumes, thereby allowing for game experimentation and targeting of different demographic groups other than core players. However, as described above, lottery ticket manufacturers have developed infrastructures that primarily support fixed plate printing, with monochromatic variable indicia imaging or at most dual spot color variable indicia imaging that inherently has a high start-up cost, thereby restricting print runs to high volumes to amortize the costs over longer print runs.

For example, ten-dollar instant ticket games with higher paybacks and more ways to win now account for over $5 billion a year in United States lottery sales. But, limited by the fixed plate and high-volume restrictions enforced by current manufacturing techniques or practices, these higher priced instant games are still generic in nature and consequently result in a minor percentage of overall game offerings with limited potential for assisting in consumer base diversification. In other words, the high-priced or high-volume nature of these games tends to drive the lotteries to generic and proven type of play (i.e., appealing to the existing player base) with very little experimentation and unique entertainment value relative to lower-priced instant tickets and consequently does not attract many new consumers.

Moreover, as gaming technology and systems continue to evolve and become more sophisticated, numerous new types of games and products become available that tend to distance themselves from the one-size-fits-all large-volume instant lottery ticket paradigm that has sustained the industry for decades. These gaming trends no longer support gaming to the masses, rather differentiation through information is favored, with games tracking and targeting such concepts as: predictive value, frequency, average bet, product identification, etc. However, tracking and targeting games to these concepts necessitates segmenting the player base into smaller and smaller groups or pools with each group or pool too small to sustain large volume games. Additionally, by concentrating lottery printing production in large secure facilities, the logistical challenges of distributing small game runs in addition to production challenges causes such games to be priced uneconomically and still resemble the standard instant ticket lottery product. Also, centralized production of large print runs inherently prohibits game spontaneity—e.g., seasonal tickets, greeting cards, collector cards, lottery tickets for specific chain stores, Super Bowl commemorative instant tickets celebrating the winning team in their home state, etc.

Another problem with targeted small-run instant lottery ticket printing utilizing existing technology is packaging. Traditional instant ticket packaging systems are web fed lines where the tickets are Z-folded at perforation lines, manually separated, scanned, activation cards printed, and shrink wrapped for shipping in cartons and pallets to the lottery warehouse. While efficient for large volumes of tickets, this type of inline packaging system does not readily accommodate different themed packs of tickets with potentially different store destinations.

Thus, it is highly desirable to develop instant ticket manufacturing techniques with more variable and dynamic appeal that provide methods of offering new gaming opportunities, particularly more customized and consequently smaller volume games. Ideally, these games should include process color digital variable printing, thereby allowing for flexibility and creativity for game designers to tailor games to a wide variety of small targeted segments heretofore not served by existing instant ticket gaming offerings, in turn appealing to a broader base of consumers.

SUMMARY OF THE INVENTION

Objects and advantages of the invention will be set forth in part in the following description, or may be apparent from the present description, or may be learned through practice of the invention.

Methodologies and systems are proposed to ensure the integrity and security of printing lottery instant ticket secure variable indicia and other images with modern process color off-the-shelf digital imagers. If adopted, these same methodologies also enable lottery instant ticket printing on demand, in small volumes, and distribution across multiple entities and locations. The methodologies disclosed herein thereby accommodate the high data requirements of imaging process color indicia and other images on instant lottery tickets in a secure and reliable manner. Additionally, the methods disclosed also enable validating and auditing of the lottery ticket images by an outside party.

In accordance with aspects of the invention, a system has been invented for enabling modern digital printing systems in a distributed environment in which both secure and non-secure portions of lottery instant tickets or security-enhanced documents are printed with secure variable game indicia and validation information in process color on demand. Security-enhanced documents produced with this system will include a removable SOC and secure variable (win or lose) indicia, which may be an instant lottery ticket in certain embodiments.

Prior to this invention, methods of commercially producing digital data for secure documents or lottery tickets with digitally printed process color variable images have not been developed to adequately secure, audit, and physically produce images with both secure and non-secure portions. Additionally, economic production of low volume lottery instant tickets with the capabilities to print on demand as well as over a distributed network have not been possible prior to this invention.

In a first embodiment, the secure variable indicia portion of image data of an instant lottery ticket is separate from any non-secure portion (e.g., display, back and overprint) image data, such that the secure portion can be encrypted into ciphertext with the non-secure portion remaining plaintext or cleartext. This embodiment has a primary advantage of enabling distribution and storage of instant lottery ticket data over non-secure networks (e.g., internet) and facilities while allowing audits of non-secure data as well as lowering bandwidth requirements of digital imagers.

In a second embodiment, the secure portion and any non-secure portions of an instant lottery ticket image data are encoded in PostScript vector graphics. This embodiment has several advantages in terms of efficiencies, standard interfaces to off-the-shelf digital imagers, as well as security and isolation of secure and non-secure image data. In a particular embodiment, PostScript calls to font characters comprising the variable indicia are encrypted via one time pad encryption where the PostScript font calls are decrypted from ciphertext to cleartext by PostScript. This embodiment has the advantage of enabling secure stored ciphertext of variable indicia data that can be decrypted when printing.

In a third embodiment, the digital imager RIP (Raster Image Processor) that is typically an integral part of a modern high-volume digital imager is enabled for additional tasks other than raster image generation. One embodiment would utilize the digital imager specific RIP to decrypt the secure portion of the instant lottery ticket image variable indicia data.

In a fourth embodiment, the secure variable indicia win or lose data are encoded as glyph fonts. This embodiment has an advantage of reducing the bandwidth requirements of imaging indicia in four-colors as well as allowing game programming and layout to be abstracted. Thus, the variable indicia characters can be automatically generated and sized rather than manually created or adjusted as is now common. This embodiment is partially enabled by the higher resolution (e.g., 800 dpi and above) of off-the-shelf digital imagers relative to exiting low-resolution (i.e., 240 dpi) imagers, thereby enabling varying output sizes.

In a fifth embodiment, conversion or un-conversion (i.e., converting or un-converting the generated lottery ticket win or lose secure variable indicia data printed to or read from digital imaging) is controlled by a parameter driven system, as well as associated art files. This embodiment enables economic generation of small sized print runs with very little programming costs.

In a sixth embodiment, the instantaneous variability in digitally imaging instant lottery tickets is utilized to print pack activation, destination, or display cards (without winning variable indicia) inline at the beginning or end of each pack of tickets. This embodiment has the advantages of enabling production of specialized tickets with specific destinations over both local and distributed printing facilities while at the same time reducing packaging and labor costs.

In a seventh embodiment, middleware, sometimes considered to be a middleware interpreter, is used to convert present lottery production standard imager format IJPDS (Inkjet Printer Data Stream) variable indicia data, typically fed to 240 dpi Kodak imagers, to PostScript or some other vector printing language suitable for high quality process color imagers (e.g., Memjet, HP, Xerox) RIPs. This embodiment has the advantage of utilizing traditional game generation functionality to distribute the instant ticket prizes throughout the print run while at the same time enabling high quality color graphics. This benefits from the use over decades of proven reliability, security, and audit capabilities of the traditional game generation software prize award and distribution, while at the same time enables greatly enhanced printed full color graphics that would not be possible with the traditional IJPDS format alone.

Described are a number of computing mechanisms that provide practical details for reliably producing secure instant lottery tickets in process color, on demand, and across multiple locations and entities ultimately culminating with a digital audit trail. Although the examples provided herein are primarily related to lottery instant tickets, it is clear that the same methods are applicable to any type of secure document with indicia hidden by a SOC. Therefore, as used herein, "ticket," "instant ticket" or "instant lottery ticket" means lottery tickets and any other type of security-enhanced documents using a SOC to hide indicia, particularly variable indicia, from being viewed without removing at least a part of the SOC.

Embodiments of the invention also include the aspects set forth in the listing directly after the heading "DETAILED DESCRIPTION."

BRIEF DESCRIPTION OF THE DRAWINGS

FIG. 9 is an exemplary view of a first representative example of a PostScript snippet capable of producing digital imaging for instant lottery tickets.

FIG. 10 is an exemplary view of a second representative example of a PostScript snippet capable of producing digital imaging for instant lottery tickets.

FIG. 13 is an exemplary view of an embodiment of a PostScript snippet as applied to one time pad encryption and decryption within PostScript.

FIG. 14 is an exemplary view of the PostScript one time pad implementation resulting ciphertext and decrypted cleartext of FIG. 13.

FIG. 16 is an exemplary view of a representative example of a PostScript snippet capable of producing glyphs of three different versions of the seven of spades indicia.

FIG. 17 is an exemplary view of a representative example of a PostScript snippet capable of producing vector graphic glyphs of the seven of spades indicia.

DETAILED DESCRIPTION

Figure 1:
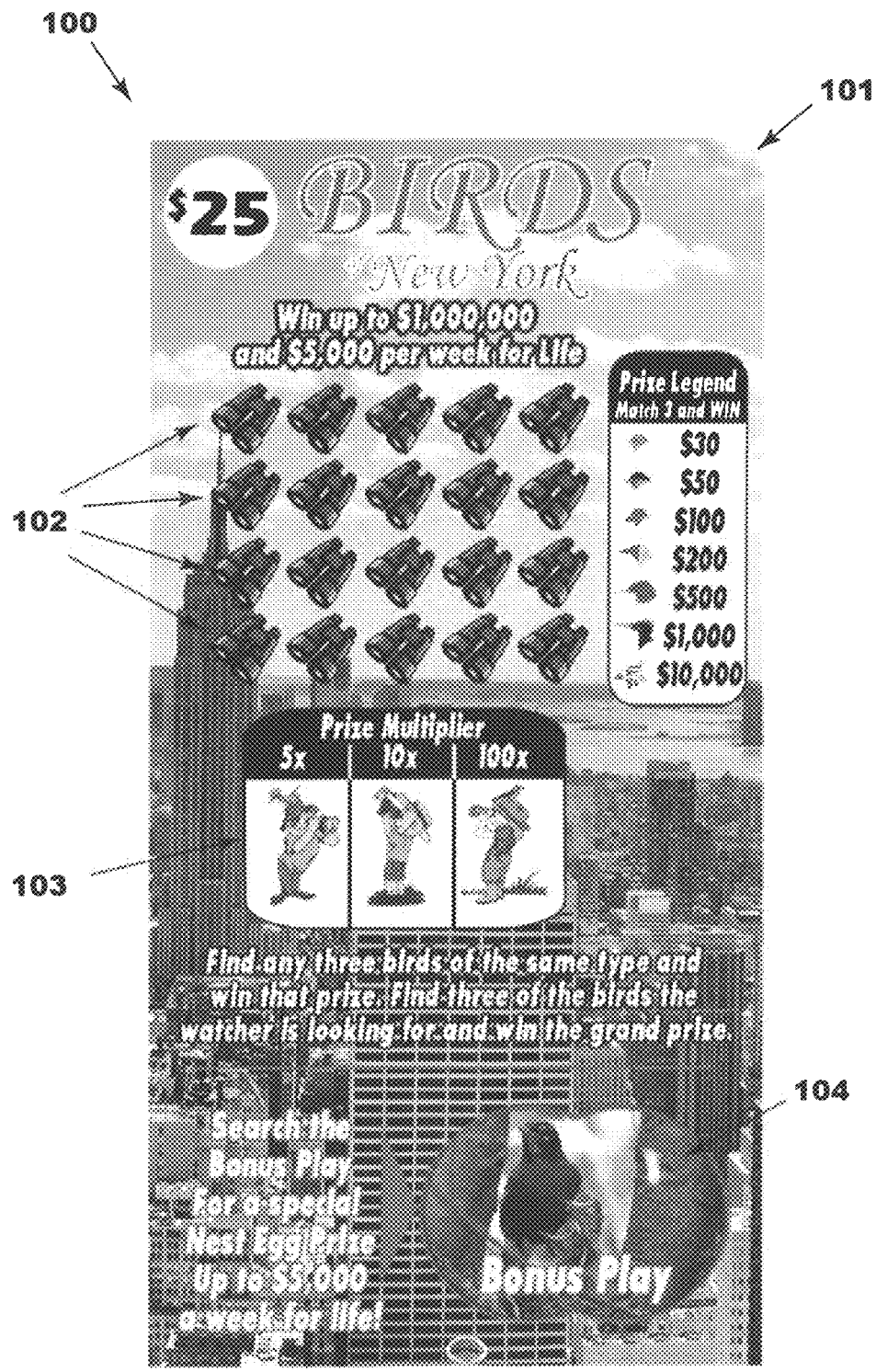
FIG. 1 is an exemplary front elevation view of an instant lottery ticket showing secure and non-secure portions produced by digital imagers, with underlying images below their SOC shown in the dashed-line box.
Figure 1:
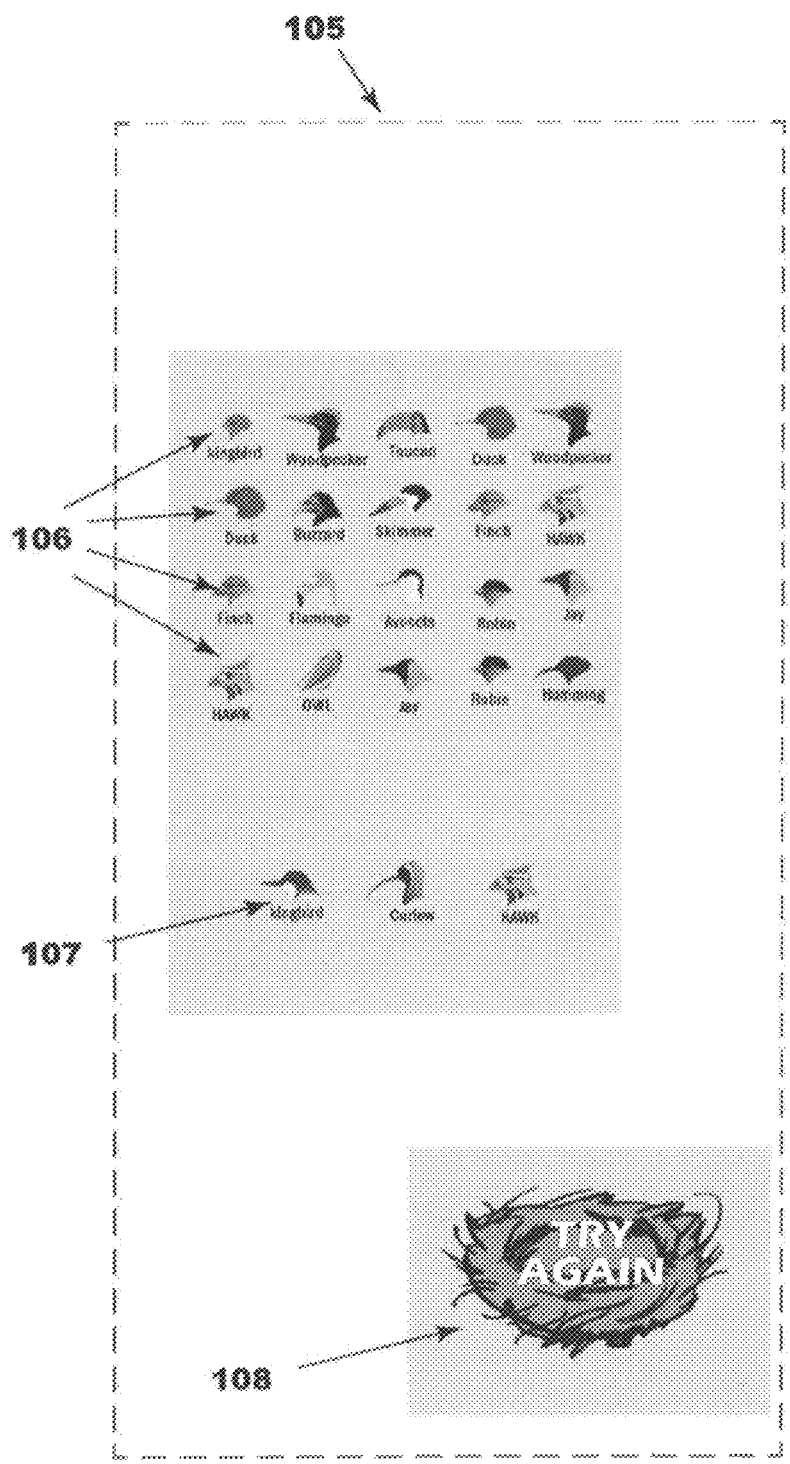

Embodiments of the invention also include the following aspects:

1. A method of digitally imaging a secure portion and a non-secure portion of scratch-off-coating protected documents of at least one game using middleware, the documents including secure variable indicia and non-secure variable indicia, the documents and the at least one game being associated with at least one overall print run, each print run including (i) a plurality of non-winning documents and (ii) a plurality of winning documents determined by revealing secure variable indicia according to predetermined game programming, and wherein at least the secure variable indicia portion of digital imaging is hidden under the scratch-off coating, the method comprising: (a) generating the secure variable indicia in at least one non-vector raster format; (b) generating vector graphics to be imaged on physical locations of the documents; (c) assigning the secure variable indicia in at least one non-vector raster format to documents in a print run and shuffling the documents throughout the print run; (d) linking via middleware the secure variable indicia in the at least one non-vector raster format to associated vector graphics variable indicia to be digitally imaged on the documents and to generate vector graphics-formatted data for each document in the print run; wherein the secure variable indicia assignment and shuffling are executed by non-vector raster game generation software output that is reinterpreted by the middleware to produce related vector graphic output for the secure variable indicia.

2. The method of 1, wherein the vector graphics-formatted data are generated using PostScript language.

3. The method of 1, wherein the documents have at least one display portion with non-secure variable indicia.

4. The method of 3, wherein the non-secure variable indicia are imaged over at least part of the at least one of the secure indicia portion.

5. The method of 1, wherein the documents comprise lottery tickets.

6. The method of 1, wherein the vector graphics-formatted data comprise fonts and glyphs stored in a database accessible by the middleware.

7. The method of 1, wherein the vector graphics-formatted data comprise fonts and glyphs stored in a database, the fonts and glyphs representing vector graphics indicia substitutions for the respective non-vector raster formatted variable indicia.

8. The method of 1, wherein the vector graphics-formatted data produce monochromatic indicia.

9. The method of 1, wherein the vector graphics-formatted data produce process color indicia.

In the context of this invention and description, "secure" portions of lottery tickets or other documents refers to variable indicia that are hidden under a Scratch-Off-Coating (SOC) until the ticket or document is played, namely, when the SOC is scratched away. "Non-secure" portions of lottery tickets or other documents refers to areas with indicia that may or may not be variable (but in some embodiments of the present invention, they also are variable) and that are visible while the ticket or document is in a pristine condition—i.e., not scratched or played. Examples of "non-secure" areas would include a ticket or document's display, overprint, or backing. In the context of this invention, the term "four-color" imaging refers to a specific subset of "process color" imaging, so the use of the term "four color" imaging or like terms includes "process color" imaging and where "process color" imaging or like terms is used, it includes the broader "four color" imaging.

In the context of this invention and description, a "game" means a specific government or commercial lottery game having specific rules (e.g. a "Lucky 4" lottery game may have different rules, say requiring four matches among the secure variable indicia under a SOC to win a prize, compared to a "Lucky 3" lottery game that requires only three matches among the secure variable indicia under a SOC to win, or a commercial game like a "Monopoly" game with various secure variable indicia under a SOC to be revealed and perhaps collected to win of a type that has been run by McDonalds or food store chains), a secure SOC card (e.g. credit or gift card with secure variable indicia under a SOC indicating value according to certain conditions), a store or restaurant coupon (e.g. revealing secure variable indicia under a SOC to win premiums, discounts or food or drink items), or, or other similar types of games or contests or sweepstakes, each with particular rules for playing, winning, obtaining the results provided with respect to any particular set of secure variable indicia.

In the context of this invention and description, a "gaming document" is a document imaged with secure indicia according to the rules of the game. A "gaming document" is also just referred to as a "document" throughout this description and claims unless the document is described as being a "non-gaming document" or "non-gaming document insert" with non-secure digitally imaged indicia that, for example identify breaks among different gaming documents within one or more print runs that may be produced according to embodiments of the present invention.

Producing and ensuring the security of an on-demand instant ticket print run across potentially multiple locations in an economically viable fashion require segmentation, synchronized release of information, and coordination. By segregating the secure variable indicia from the non-secure (e.g., display, overprint, ticket back, etc.), digital imager data efficiencies in game production, audit, security, and imager bandwidth can be realized. Abstraction of both the secure and non-secure digital imager data with vector graphics using languages such as PostScript as well as glyph symbols also greatly increases efficiencies in game production, audit, security, and imager bandwidth.

Both segregation and abstraction of digital data has not been attempted with traditional fixed plate printing of non-secure images and drop-on-demand ink jet imaging of indicia for instant lottery tickets. Because of the limited graphics capacity of monochromatic or spot color drop-on-demand ink jet imaging, printed instant lottery tickets variable digital imaging is exclusively confined to secure indicia with all higher-quality non-secure printing accomplished via analog fixed plates. Thus, segregation of secure and non-secure indicia previously has been accomplished via separate inline digital and analog printing techniques with no need to separate imager data. Abstraction (e.g., PostScript vector graphics, invented 1982) has heretofore not been incorporated for instant lottery ticket production due to the non-vector raster interface (i.e., "IJPDS"—a.k.a. "Inkjet Printer Data Stream") typical of monochromatic drop-on-demand ink jet imagers that does not accommodate abstraction as well as the relatively low resolution (e.g., 240 dpi) of such imagers.

Reference will now be made to one or more embodiments of the system and methodology of the invention as illustrated in the figures. It should be appreciated that each embodiment is presented by way of explanation of aspects of the invention, and is not meant as a limitation of the invention. For example, features illustrated or described as part of one embodiment may be used with one or more other embodiments to yield still further embodiments. This invention includes these and other modifications that come within the scope and spirit of the invention.

FIG. 1 depicts an exemplary front elevation view of the non-secure portions or areas 100 and the secure portions 105 of a digitally imaged instant lottery ticket. As shown in FIG. 1, the non-secure areas 100 include a display portion 101 and overprint portions 102 (twenty shown), 103 (three shown), and 104, which are exposed on the surface of an unpurchased (i.e., unscratched) ticket, thereby providing the consumer with an enticing front that also explains how the game is played as well as possible prizes. In contrast, the secure portions 105 of variable indicia 106 (twenty shown), 107 (three shown), and 108 are imaged such that the variable indicia imaging is hidden by SOC and overprint portions 102, 103, and 104, respectively, until the ticket is purchased and played.

Figure 2:
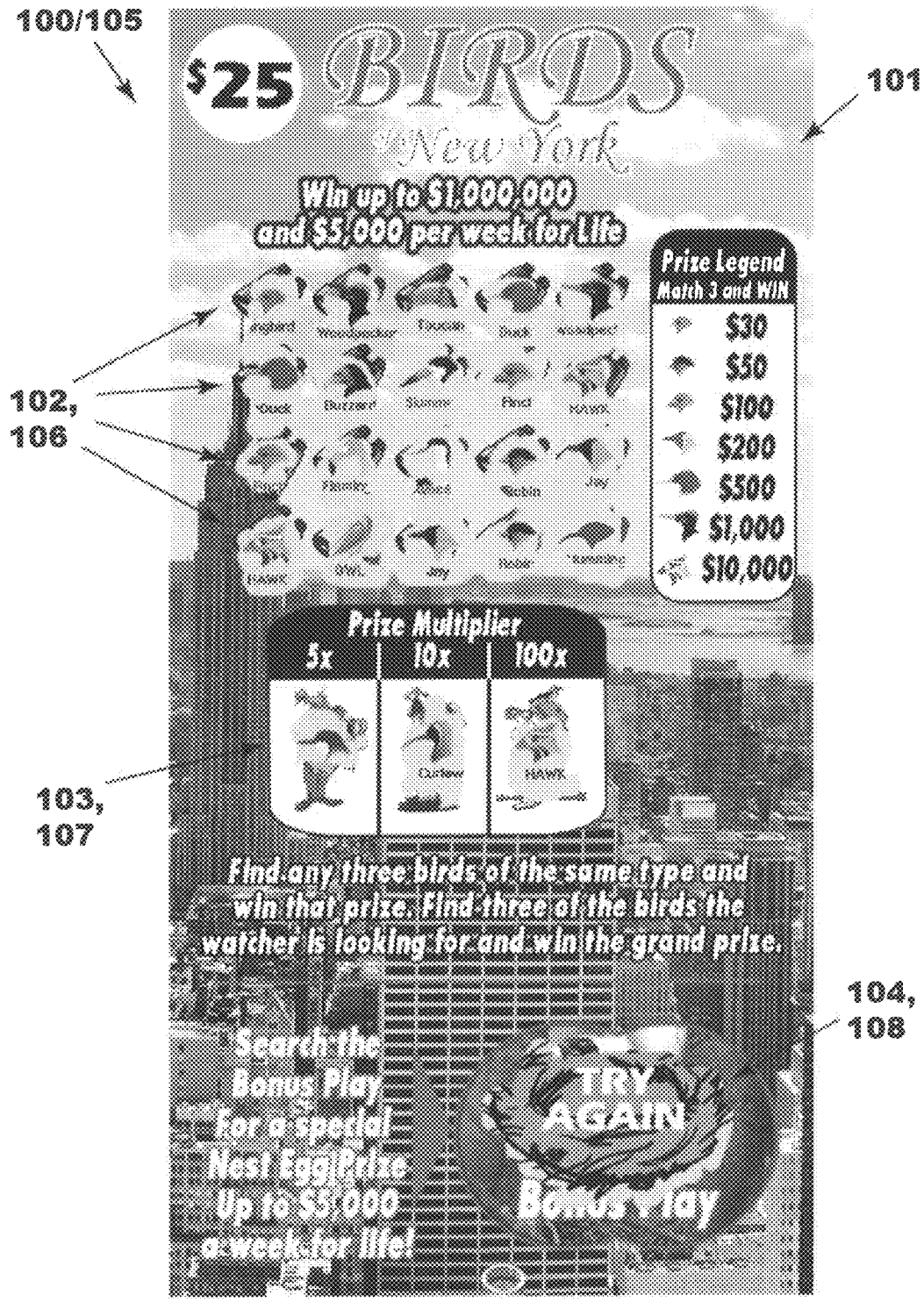
FIG. 2 is an exemplary front plan view of the composite of ticket images of FIG. 1 with its SOC partially removed.

FIG. 2 depicts a composite image of the non-secure portions 100 and the secure portions 105 of the ticket of FIG. 1, as it would appear after it was purchased and typically played (i.e., with the SOC partially removed). As illustrated in FIG. 2, the revealed, previously secure variable indicia 106 (twenty shown), 107 (three shown), and 108 graphically depict the game's outcome, thereby ensuring that the ticket could not be resold as pristine.

Figure 3:
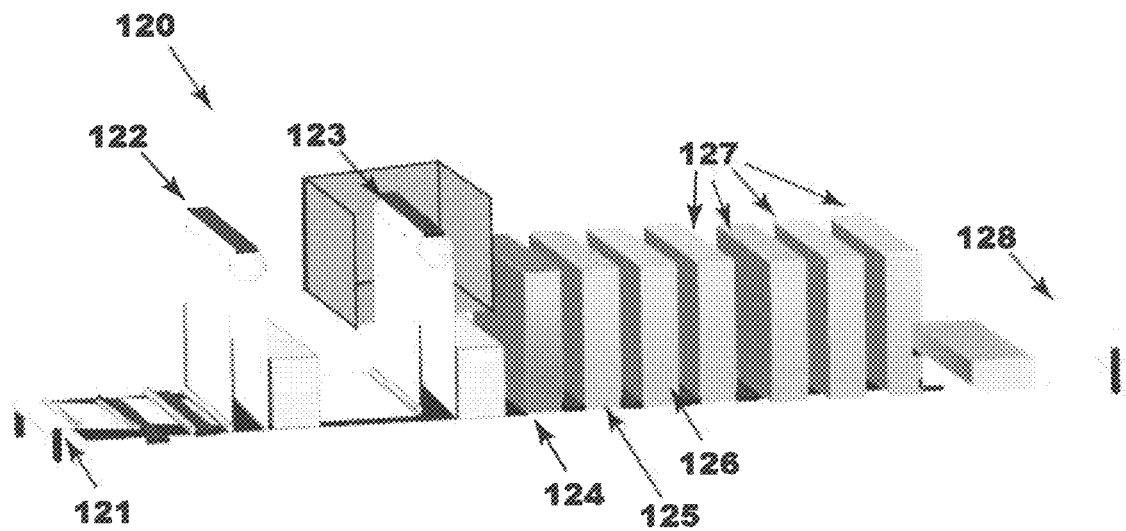
FIG. 3 is a schematic front isometric view of one embodiment of a digital imager instant ticket printing line capable of printing the exemplary ticket of FIG. 1 and FIG. 2.

FIG. 3 is a schematic front isometric view of an embodiment of a digital imager instant ticket printing line 120 capable of printing the exemplary ticket of FIG. 1 and FIG. 2. In embodiment of printing line 120, paper is supplied to the printing line via web feed 121 being pulled into a first digital imager 122 where the ticket's secure variable indicia portion 105 (FIG. 1) is printed. Secure printing of the variable indicia portion 105 directly on the web is possible if the web feed paper is of a secure stock (e.g., foil, opacity paper, etc.) or was pretreated to add opacity and possible chemical barriers with a process prior to being fed to the printer line 120 (FIG. 3). Optionally, both the ticket's secure variable indicia portion 105 (FIG. 1) and display portion 101 could be imaged simultaneously by the first digital imager 122 (FIG. 3) with the secure variable indicia and non-secure image data merged at or prior to the RIP (Raster Image Processor—not shown in FIG. 3) of the first digital imager 122 of the first digital imager. A second digital imager 123 then receives the web from the first digital imager 122 and prints the ticket back. After the second digital imager 123, the web passes through a series of inline fixed plate (e.g., flexographic) printing stations 124-127. A release coating is applied by the printer 124 (enabling subsequent coatings to scratch-off). At least one opacity coating is applied by the printer 125. A white SOC is applied by the printer 126, and four color (CMYK) process printers 127 follow in line after the SOC printer 126. If both the ticket's secure variable indicia portion 105 (FIG. 1) and non-secure display portion 101 were imaged simultaneously by the first digital imager 122 (FIG. 3), then the four fixed plate process color (CMYK) printers 127 would only image the overprint portions 102, 103, and 104 (FIG. 1). Otherwise, if the first digital imager only prints the secure variable indicia portion 105, the fixed plate process color printers 127 (FIG. 3) would image the non-secure overprint 102, 103, and 104 portions (FIG. 1), as well as the display portion 101. A web take-up reel 128 then collects the printed ticket stock for further processing by a packaging line.

Figure 4:
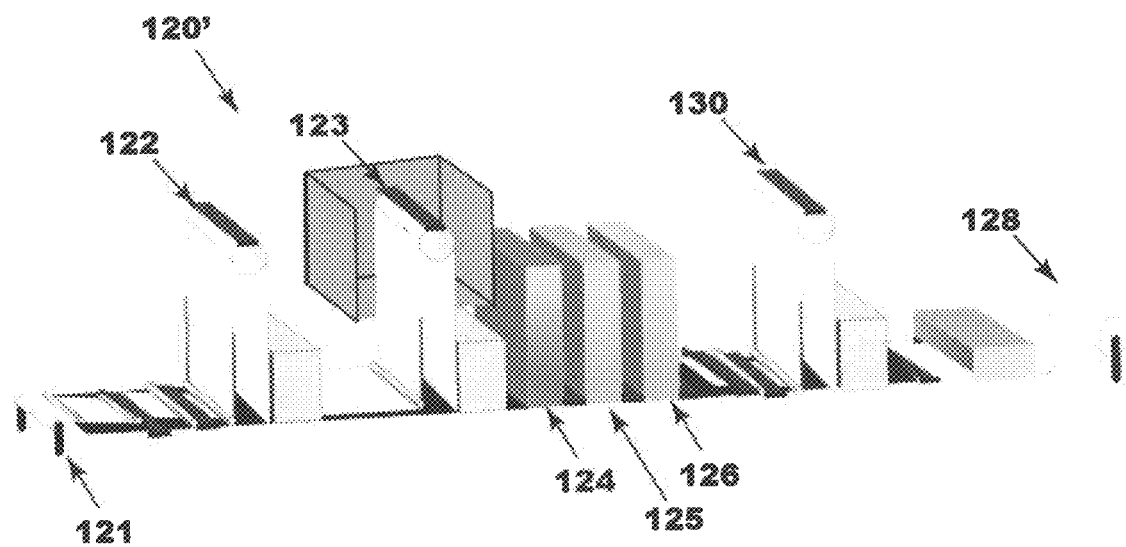
FIG. 4 is a second alternative schematic front isometric view of an embodiment of a digital imager instant ticket printing line capable of printing the exemplary ticket of FIG. 1 and FIG. 2.

FIG. 4 depicts another embodiment of a digital imager instant ticket printing line 120' capable of printing the exemplary ticket of FIG. 1 and FIG. 2. As before, in the printing line 120' secure paper is supplied to the printing line via web feed 121 being pulled into a first digital imager 122 where the ticket's secure variable indicia and optionally non-secure display are printed. Also as before, the second digital imager 123 then receives the web from first digital imager 122 and prints the ticket back. After the second digital imager 123, inline fixed-plate printing stations 124 through 126 apply a release coating with the subsequent opacity layer and white SOC. Finally, CMYK process color overprints are applied by a third digital imager 130. As before, a web take-up reel 128 collects the printed ticket stock for further processing by a packaging line. If both the ticket's secure variable indicia and display were imaged simultaneously by first digital imager 122, then the third digital imager 130 would only image the overprint portions; otherwise, the third digital imager 130 would image both the display and overprint portions. The printing line 120' has the advantage of fewer fixed plate printing stations and consequently, greatly reduced make-ready (setup) time and expense for printing game to game.

Figure 5:
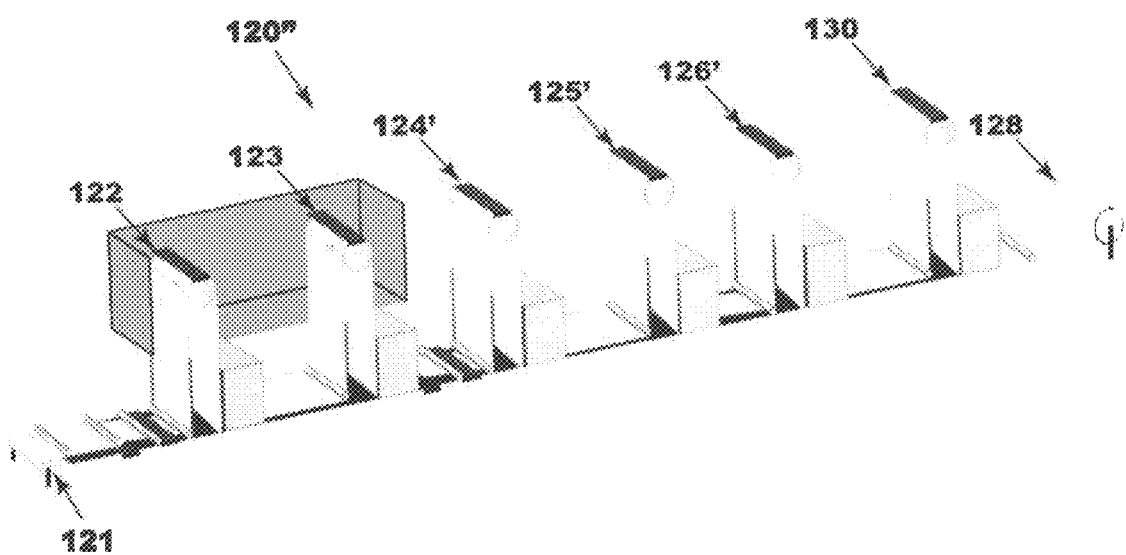
FIG. 5 is a third alternative schematic front isometric view of an embodiment of a digital imager instant ticket printing line capable of printing the exemplary ticket of FIG. 1 and FIG. 2.

FIG. 5 depicts one presently preferred embodiment of a digital imager instant ticket printing line 120" capable of printing the exemplary ticket of FIG. 1 and FIG. 2. As before, in the printing line embodiment 120" secure paper is supplied to the printing line via web feed 121 being pulled into a first digital imager 122 where the ticket's secure variable indicia and optionally non-secure display are printed. Also as before, the second digital imager 123 then receives the web from the first digital imager 122 and prints the ticket back. However, after the second digital imager 123, a third digital imager 124' prints the release coat, followed by a forth imager 125' printing the upper opacity layer, a fifth imager 126' printing the white SOC, and a sixth digital imager 130 printing the CMYK process colors. As before, a web take-up reel 128 collects the printed ticket stock for further processing by a packaging line. If both the ticket's secure variable indicia and display were imaged simultaneously by first digital imager 122, then the sixth digital imager 130 would only image the overprint portions; otherwise, the third digital imager 130 would image the display and overprint portions in addition to providing the release, upper opacity, and white SOC layers. The printing line 120" has the advantage of no fixed plate printing stations and consequently, virtually no make-ready time for changing printing game to game.

There are at least three manufacturers of high-resolution web based digital imagers capable of supporting embodiments 120, 120' and 120", namely Hewlett Packard (HP) Indigo, Xerox CiPress series, and Memjet that are high-resolution process color imagers that accept vector graphics (e.g., PostScript) and glyphs.

Of course, as would be apparent to one skilled in the art in view of the present disclosure, there are numerous other permutations of digital imager printing lines (e.g., flexographic stations before the first digital imager, additional flexographic stations between the second and third digital imagers, sheet feed paper, etc.) that may under some circumstances be preferable to the disclosed embodiments. The significant point is that four-color digital imagers print the secure variable indicia portion and preferably some or all of the non-secure portions of an instant ticket.

Those skilled in the art will also appreciate that protection and coordination of digital secure variable indicia and digital non-secure indicia portions of lottery tickets have so far been confined to niche products like lottery Bingo tickets where the secure call number variable indicia is covered under the SOC and the non-secure Bingo card indicia is displayed openly on the ticket. The relatively low bandwidth requirements of existing 240 dpi monochromatic or spot color drop-on-demand imagers have eliminated the need for special processing of the non-secure variable indicia (e.g., Bingo cards) to date due to bandwidth, with all image data typically being handled as secure. Counterintuitively, this practice of treating all variable indicia as secure data may have contributed to a security failure. In March 2007 the Ontario Lottery and Gaming Corporation (OLG) was forced to recall over a million "Super Bingo" instant lottery tickets after it was announced that a mathematician (Srivastava) claimed that he could visually tell which tickets were winners by examining the non-secure Bingo card indicia displayed on the front of the tickets. By conducting an analysis of a collection of played "Super Bingo" tickets, Mr. Srivastava apparently identified a flaw in the algorithm that generated the secure "Super Bingo" call number variable indicia and the associated non-secure Bingo card indicia, identifying several "tells" in the non-secure indicia cards that would indicate if the ticket were a winner without the need to remove the SOC and expose the secure call number variable indicia. While the underlying problem was a flaw in the algorithm that generated the "Super Bingo" indicia, it can be argued that if the non-secure Bingo call card indicia were subjected to the same Quality Assurance (QA) and audits applied to the ticket's non-secure display and overprints the tell may have been detected by the manufacturer before the tickets were shipped.

In addition to the special case of Bingo tickets with secure and non-secure variable indicia all being handled as secure data, there have been previous attempts to coordinate a ticket's variable non-secure plate printed display (i.e., limitedly varied by different images around a printing cylinder) and the secure variable indicia with a winning ticket identified by matching the secure monochromatic or spot color indicia with the full color display symbols. This type of printing technique is problematic because it requires that the drop-on-demand ink jet imager be "cognizant" of the orientation of associated inline analog cylinder(s). Producing instant lottery tickets with game play requiring coordination between the analog cylinder positions and the drop-on-demand ink jet imagers has proven difficult with games being recalled after they were placed on sale. For example, a series of Lotto Quebec's "Ble D'or" instant lottery tickets were recalled in 2011 when it was discovered that synchronization between the non-secure display and the secure variable indicia was lost, resulting in non-winning tickets appearing to be winners.

By simultaneously imaging both secure and non-secure portions of an instant lottery ticket with inline digital imagers, problems associated with synchronization and concealment of non-secure data from audits can be avoided. Additionally, efficiencies are realized in terms of start-up costs, small volume ticket print runs with targeted games, print on demand, and printing over a large area network, etc. However, these efficiencies and other gains come at the cost of substantial increases in the amount of imager data to be processed. Changing from monochromatic or spot color drop-on-demand imaging (i.e., 1-bit per dot) to four-color imaging (i.e., 32-bits per dot) along with its resolution (i.e., 240 dpi increasing to 800 dpi) results in over 355 times per square inch of printing surface increase in data versus monochromatic imaging. Additionally, by digitally imaging the variable indicia, ticket front, and optionally overprint zones the imaging area of an instant ticket increases substantially—e.g., from 30% of the ticket front to the entire front surface. This massive increase in data has the consequence of greatly increasing imager bandwidth requirements. For example, assuming that a one-foot wide area of web is imaged at a low print speed of 100 FPM; then monochromatic (1-bit) imaging at 240 dpi would require a continuous imager data bandwidth of approximately 14 Mbps to print in a continuous uninterrupted fashion. By contrast, process color imaging (i.e., 32-bit at a higher resolution) over the same area and speed will require an aggregate imager bandwidth of approximately 5 Gbps.

Figure 6:
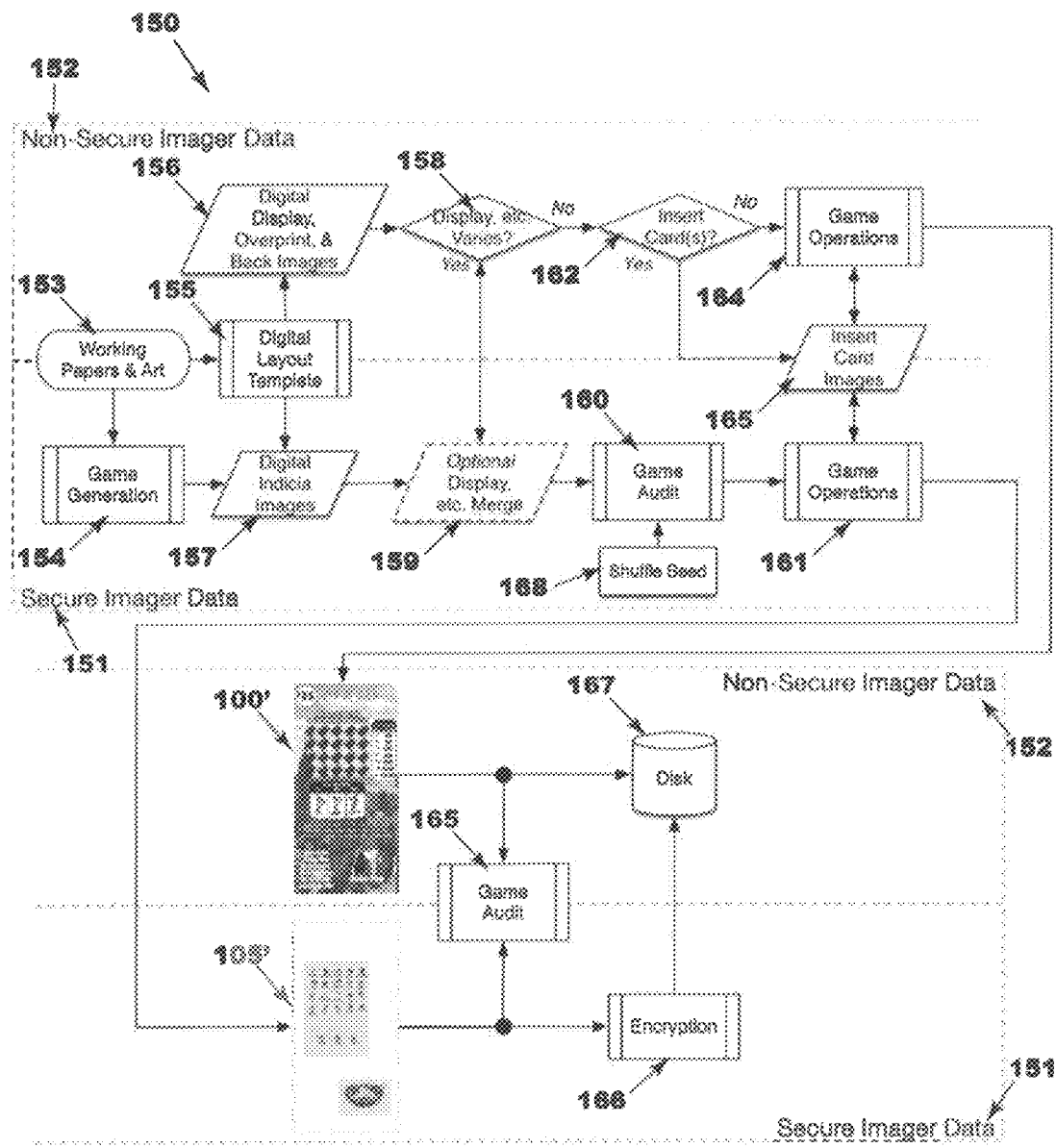
FIG. 6 is a swim lane flowchart providing a schematic graphical overview of a first embodiment as applied to segregating secure and non-secure portions of instant ticket digital data during the preproduction process and compatible with the embodiments of FIG. 3, FIG. 4, and FIG. 5.

Therefore, in order to image both secure and non-secure areas of instant lottery tickets in line with high resolution process colors it is necessary to develop methodologies to accommodate the massive amounts of data and bandwidth required for instant lottery ticket print runs. FIG. 6 illustrates an embodiment of a swim lane flowchart 150 to provide a foundation for streamlining data handling digital imaging of both secure and un-secure portions of instant lottery tickets. This flowchart 150 for streamlined data handling is completely compatible with the physical inline imager press embodiments of FIG. 3, FIG. 4, and FIG. 5.

As illustrated in the flowchart 150 of FIG. 6, instant lottery ticket imager data is conceptually divided into two groups (secure group 151 and non-secure group 152) by the two "swim lane" rows on the top and bottom. If a particular flowchart function appears completely within a swim lane, its functionality is limited to the data category of the associated swim lane—e.g., function 156 is exclusively for non-secure imager data in group 152. If a particular flowchart function appears intersected by the horizontal border between the two swim lanes, that functionality is applicable to both secure data in group 151 and non-secure data in group 152.

Returning to FIG. 6, the method of creating process color digitally imaged instant lottery tickets begins with creating a specification and associated artwork 153 (also called "working papers") defining the ticket to be printed. Once created and agreed upon by all involved parties, the working papers 153 are used to specify the game generation software 154 that will determine which tickets win as well as how the game secure and non-secure variable indicia appear on the tickets. Ticket digital artwork is loaded on a template 155, thereby providing access from both the secure group 151 and the non-secure 152 group, as well as ensuring the artwork will be compatible with the overall ticket layout—i.e., display, ticket back, variable indicia, and overprint. The game generation software 154 accesses applicable variable indicia artwork from the template 155 ultimately referencing the variable indicia artwork symbols or fonts in specific locations, types, arrangements, and (optionally) styles on every virtual ticket in the pending game print run. At the same time, non-secure artwork 156 (e.g., display, ticket back, overprints) is also accessed from digital design template 155. As shown in FIG. 6, this non-secure imager artwork 156 is maintained separate from the secure imager artwork 157 under a parallel production path. Those skilled in the art will recognize from this description that this parallel path does not exist with current instant lottery ticket production, since non-secure artwork is printed via analog fixed plates and not by digital imagers.

Some instant lottery ticket game designs may specify non-secure display imaging 101 (FIG. 1) that vary from ticket to ticket. This variable non-secure display imaging can be associated with game play (e.g., Bingo cards, horoscope sign themed tickets and associated variable indicia, travel scenes and associated variable indicia) or independent of game play (e.g., different display scenes, collector themed tickets, etc.) In either case, if the display will vary, the game generation software in the secure imager data group 151 (FIG. 6) is notified with any variable display artwork 158 coordinated by the game generation software 159. However, coordination of display with variable indicia involves the game generation portion 159 of the secure group 151 referencing (e.g., pointers, fonts, glyphs, postscript calls) the non-secure (e.g., display) images with the actual non-secure imaging data remaining in the non-secure group 152.

While the method of referencing the non-secure imaging may vary, it is essential that under no circumstances may the non-secure imaging provide any indication of the win or lose status of the secure variable indicia that will be hidden under the SOC of unsold tickets. In instances where variable non-secure display imaging is associated with game play, this requirement can be surprisingly difficult to implement. Thus, as a practical matter, an overall non-secure design requirement should be that any combination of non-secure display elements must be capable theoretically of being imaged on all prize level tickets including non-winners. For example, a horoscope themed game may feature non-secure display printing where each ticket is themed to an individual zodiac sign with a winning ticket indicated when at least one of the secure variable indicia (hidden under the SOC of unsold tickets) is the same zodiac sign as the non-secure display. In this example, the overall game must be designed such that all zodiac signs are capable of winning any prize level, with a losing ticket denoted by a non-match.

Once the game generation software is completed, an audit 160 is performed to ensure compliance with the working papers 153, including the number of winners and losers, graphics, distribution of winners and losers, etc. Assuming the audit 160 is successful, one or more random or pseudo-random shuffle number or numbers referred to in this technology as a "seed" or "seeds" 168 is or are derived that determine the arrangement of winning tickets in the production run with the shuffle seed or seeds applied to the audited game generation software to produce a data file 161 for game operations containing all of the secure variable indicia 105' for all of the tickets in a game. Thus, the winning and losing secure variable indicia is distributed throughout the print run with the associated non-secure display portions shuffled with the variable indicia by soft referencing (e.g., pointers, fonts, glyphs, postscript calls).

By digitally imaging both the secure variable indicia portion 105' and non-secure indicia (variable or not) portion 100' of an instant lottery ticket, it becomes possible to print inline documents that are not necessarily lottery tickets. For example, packs of lottery tickets often contain non-gaming document inserts, often called activation cards, that are used by the retailer opening a pack to notify the central site that the pack was received and is now put on sale. Another example of inline-produced non-gaming documents would be display cards that allow the retailer to place the card on display in possibly easy reach of the consumer, so that the consumer can inspect the game without compromising any "live" or unplayed lottery tickets. As those skilled in the art will appreciate in view of this disclosure, heretofore these types of non-gaming documents had to be manually inserted during the packaging process with a consequently greater chance of error. However, with the present invention, all data for a ticket preferably is digitally imaged, thereby allowing for insertion of these types of documents in line with corresponding increases in efficiencies as well as reductions in potential error rates.

As shown in FIG. 6, the embodiment of the flowchart 150 accommodates optional insertion of inline documents ("cards") 162 by informing the audited game software to coordinate document images 165 when the document or card insertion software is being executed in the game operations processor 161. Since these documents are typically non-secure, a parallel game operations process 164 can be executed to process only non-secure data 152. In the event that no inline documents are required by the working papers 153, the parallel process 164 would still execute to create the data for the non-secure digitally imaged portions—e.g., front display and overprint 100'. This parallel process 164 could be custom created with the game generation software 154 or could be custom created independently or could be generic. Of course, in some embodiments the secure game operations processor 161 could create both the data for the variable indicia of the secure portion 105' and the data for the indicia (variable or not) of the non-secure portion 100' of the instant lottery tickets. However, these embodiments need increased processor loading as well as include increased complexity of the critical game operations software 161, with possibly greater customization from game-to-game.

After the game operations 161 and 164 are completed and the secure portion 105' and non-secure portion 100' of digital imager data are created, an audit 165 of the generated secure portion 105' and non-secure portion 100' of digital imager data is conducted to ensure production compliance with the working papers 153. Assuming the audit 165 is successful, the non-secure data portion 100' is saved in a database 167 locally or remotely with the secure data portion 105' first being encrypted by processor 166 prior to being saved in the same database. In an alternative embodiment, two separate databases, one for the secure data portion 105' and another for the non-secure data portion 100', could be maintained with only the secure database encrypted. However, this embodiment may have errors that may arise from attempting to synchronize two different databases at the time of printing, as well as greater bandwidth requirements. In still another alternative embodiment, both the secure data portion 105' and the non-secure data portions 100' of the instant lottery tickets could be maintained in the same encrypted database. However, this embodiment requires extra processor loading and increased bandwidth associated with decrypting both the secure portion 105' and non-secure portion 100' at the time of printing.

Figure 7:
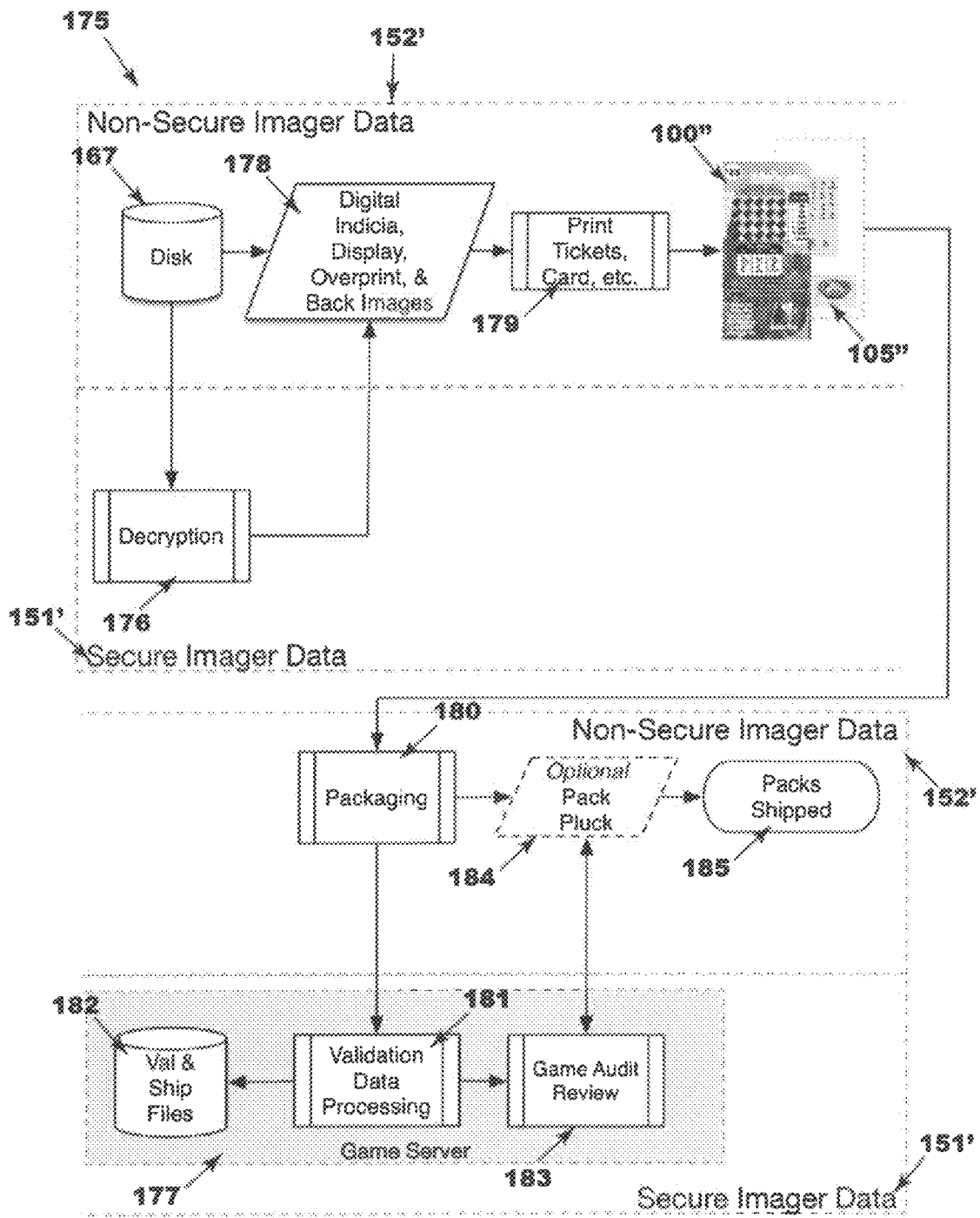
FIG. 7 is a swim lane flowchart providing a schematic graphical overview of another embodiment as applied to segregating secure and non-secure portions of instant ticket digital data during the production process.

FIG. 7 illustrates an embodiment of a swim lane flowchart 175 that continues where the embodiment of the swim lane flowchart 150 (FIG. 6) concludes. FIG. 7 shows two swim lane rows conceptually divided into two groups (i.e., secure image data 151' and non-secure image data 152') as before. The flowchart 175 continues with using the generated secure and non-secure data stored in the database 167 to physically print instant lottery tickets on demand. The secure portion of the data is first decrypted in step 176 local to the printer with the resulting secure cleartext variable indicia portion merged with the non-secure display, overprint, and ticket back portion at step 178. In the context of this invention, the term "merged" may refer to simply directing the secure portion of image data to one imager (e.g., the imager 122 in FIGS. 3 through 5) with the non-secure portions directed to the remaining imagers (e.g., 123, 130, and/or 130' in FIGS. 3 through 5). Alternatively, the secure variable indicia data may be combined with the non-secure display data in an overlay with both secure and non-secure data being printed with the same imager (e.g., 122 in FIGS. 3 through 5). Whatever the implementation, both the decryption and merging process should be pushed to the lowest level of imager interface possible. In a preferred embodiment, the decryption and merging process would occur within the imager RIP. This embodiment has the advantages of lower bandwidth requirements with enhanced security.

Returning to FIG. 7, once the secure and non-secure image data are decrypted and merged at step 178, the tickets are physically printed as in step 179 with the resulting printed tickets among merged non-secure data 100" and secure data 105" and other optional printing (e.g., activation cards, shipping cards, display cards, etc.), all to be processed by packaging lines at step 180. Once packaging is completed, a compilation of all the packs of tickets physically printed and processed is transferred to the game server 177 where the data are utilized to complete the validation data processing in step 181. The compilation data is used to generate ship and validation files at step 182 that will ultimately be loaded onto the lottery central site to authorize winning ticket validations. Assuming the print run is complete, (i.e., all tickets or packs ordered by the lottery organizer or other customer are printed at the same time) the ship and validation files will be transmitted to the lottery central site or other customer site for loading onto the validation system. However, with the embodiment of the flowchart 175, it is possible for the imaging or printing system referenced in the step 179 to print only subsets of merged physical tickets with the merged data 100" and 105" at a time with subsequent print runs gradually completing the lottery's order on demand.

In one embodiment, when on demand printing is desired, a complete validation file per the step 182 covering the entire order of physically embodied or electronic embodied tickets is transmitted to the lottery central or other customer site along with a partial ship file per the step 182, documenting only the physically embodied or electronic embodied tickets that have been so far produced. In this embodiment, subsequent print runs would result in supplementary ship files with reference to the step 182 being generated with the supplementary data appended on the previous ship file data. When transmitted, these supplementary ship files would overwrite the previous ship file stored on the lottery central site. In an alternative embodiment, on demand print data is divided by simply assigning a different game number anytime a portion of the total tickets or packs desired is printed at step 179. Even though the physically printed tickets would appear to be the same to the consumer, the different game numbers would enable different validation and ship files to be transmitted to the lottery central site or other customer site whenever a portion of the desired tickets or packs is printed.

The on demand printing capability according to the various embodiments of the present invention has the advantage of substantial reduction in waste and consequent reduction in costs to the lottery or other entity ordering the secure documents. This on demand printing is technically and economically feasible with the implementation of digitally imaging both the secure portion 105" and non-secure portions 100" of lottery tickets or other secure documents, thereby eliminating the need for complex and time consuming press setup or "make ready" periods inherent in fixed plate printing.

Returning to the production flow of the embodiment of the flowchart 175 of FIG. 7, aside from generating the validation and ship files at the step 182, involving the game server 177 and validation data processing at the step 181 also provides data for a final game audit review at step 183 to ensure that the tickets physically printed from merged unsecure data portion 100" and secure data portion 105" are within the specifications of the working papers of the step 153 (FIG. 6). In the event that extra packs or in some cases high tier winners were physically printed, the game audit review process of the step 183 would instruct Quality Assurance (QA) and security personnel local to the printing facility to pluck the packs of tickets per step 184 associated with any overages. Once any packs are plucked and physically verified at the verification step 182 with the game audit review step 183, the remainder of the print run is shipped to the lottery warehouse or other customer per step 185.

It should be noted that the game programming at the step 154 and the secure game server 177 might be located in the same facility as the imagers and packaging line. Alternatively, in a distributed printing environment, game programming at the step 154 and the secure game server 177 may be in a geographically different facility than imaging or printing, with the data exchanged over secured communications channels. Another alternative would be for game programming at the step 154 and the secure game server 177 to be in other separate facilities from each other, with the imaging or printing in still other facilities. In all of these embodiments, the secure game generation, seed generation, validation file generation, etc. physically occurs at the game server 177, thereby necessitating additional security for its portion of the overall system.

Figure 8:
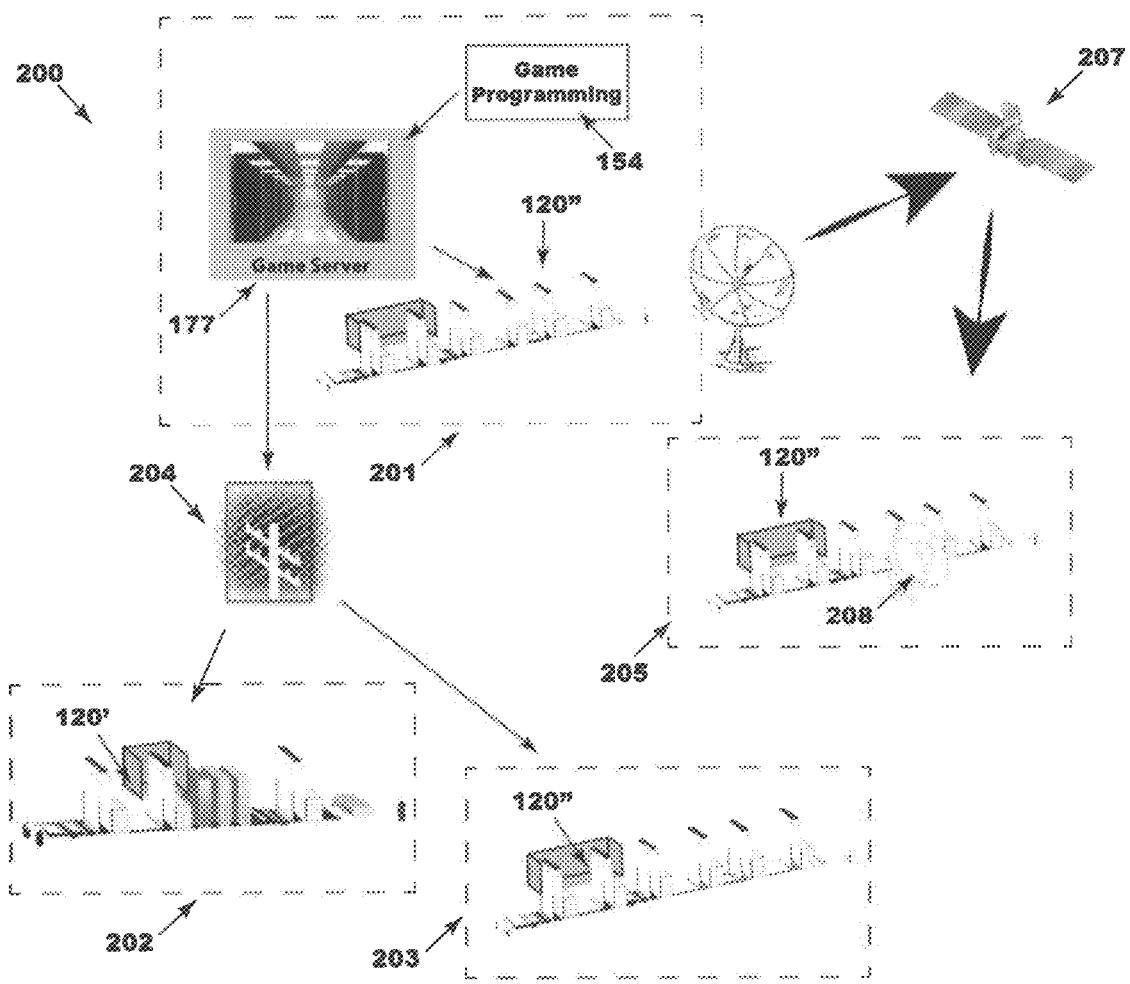
FIG. 8 is a block diagram providing a schematic graphical overview of a distributed printing system enabled by the embodiments of FIG. 6 and FIG. 7.

An example of one such distributed printing environment or network 200 is shown in FIG. 8. In FIG. 8, game programming at step 154 and the secure game server 177 are illustrated at one geographical location 201 co-located with one of the imager lines 120". In separate geographical locations 202, 203, and temporary location 205, other imager lines 120', 120", and 120"', respectively, are available over the distributed network 200 via either or both terrestrial 204 and wireless satellite methods 207 of communications. In one embodiment, distributed communications may be conducted over clear (i.e., unsecured/encrypted) communications links, since the secure portion of the ticket data is already encrypted. However, in a preferred embodiment, terrestrial and satellite communications links 204, 207 would be provided over the internet via an encrypted Virtual Private Network (VPN) utilizing the AES or some other standard encryption protocol. In the example of FIG. 8, satellite communications 207 are achieved via a satellite link with data transmitted from the game server 177, through the satellite 207, to a satellite receiver 208. As with terrestrial communications links 204, the transmitted data should be encrypted, and ideally encapsulated in a VPN.

With the distributed network 200, portions of a print on demand press run can be subdivided over multiple facilities 201, 202, 203, and 205 with respect to time, geographical proximity to lottery warehouses, type of imager press, workloads, etc., thereby enabling still greater efficiencies in the printing process. Of course, each of the multiple facilities 201, 202, 203, and 205 will have to include some form of physical security to minimize theft of product. However, with the print on demand techniques of this invention these remote security requirements can be greatly reduced in terms of digital security, since the game server 177 functions as the central data repository for all ticket production with only the allocated portions of secure or non-secure imager data necessary for on demand printing being distributed to the respective facility. Additionally, while the imager data is preferably encrypted via a secondary means of encryption (e.g., VPN) for data transmission, decryption of the second-tier transmitted data occurs at the time of reception with the decrypted transmission data preferably stored at the local facility. In this embodiment, security is maintained because the second-tier decrypted plaintext imager data includes a first-tier secure imager ciphertext data that remains encrypted. Decryption of this first-tier secure imager data preferably occurs in real time during the printing process by a system as logically close to the imager (e.g., RIP) as possible. Furthermore, the local generation by the game server 177 of ship file data at the step 182 (FIG. 7) that is ultimately transmitted with the validation file to the lottery central site or other customer facility will include a complete listing of the shipped packs of tickets that is accounted for at the lottery warehouse. Thus, theft of one or more packs from a distributed printing facility would most likely be detected when the print run is received by the lottery or other customer. Packs that were plucked or not included in the shipment to the lottery or other customer would not be included in the ship file and therefore would not validate on the lottery central site system or other customer system.

Traditional instant lottery ticket production relies on full color fixed plate printing for non-secure portions with monochromatic or spot color raster ticket imaging at 240 dpi for secure instant ticket imaging. This type of monochromatic or spot color relatively low-resolution raster imaging is required to be compatible with the high throughput drop-on-demand imager hardware and its customized interface. However, with digital imager print on demand systems as disclosed herein both the secure and non-secure portions of instant lottery ticket image data can be encoded with PostScript vector graphics. This becomes possible with the use of the new generation of digital imagers suitable for printing on demand over a distributed network that accept higher level graphics with RIP being performed as part of the imaging process. PostScript and other forms of vector graphics have numerous advantages over traditional raster scan imaging including: reduction in bandwidth, enabling encryption of secure variable indicia data that can be decrypted in real time at a logical level close to the imagers, coupling of non-secure and secure imager data, ease of audit, and significantly improved process color printed images. For purposes of backward compatibility, PostScript can also accommodate IJPDS raster graphics.

Vector graphics employ the use of geometrical primitive shapes ("primitives") such as points, lines, curves, and shapes or polygons—all of which are based on mathematical expressions—to represent images. Consequently, vector graphics can be modified (e.g., magnified, reduced, skewed, etc.) without loss of quality, while raster-based graphics cannot.

FIG. 9 provides a first-portion simplified example of a PostScript snippet 225, which would be typical, used to control ticket imaging of lottery tickets. The PostScript snippet begins with defining the colors via code 226 to be used in the secure indicia—i.e., "black" being comprised only of cyan and black ink and "red" being comprised only of magenta and yellow ink. The next step is to define the print area via code 227 followed by a font definition code 228 with the actual indicia playing card fonts specified by codes 229, 230, 232, and 233. In the snippet, omitted PostScript is identified by an ellipsis (i.e., " . . . ") 231 and 234. The second portion of the example of the PostScript snippet 225 is continued in the example of the PostScript snippet 250 in FIG. 10. This portion starts by defining the layout of the indicia on the ticket by codes 251 and 252 followed by a loop to select card indicia and place the indicia on the ticket via codes 254 and 255. The page and pattern layouts can be from different files.

Figure 11:
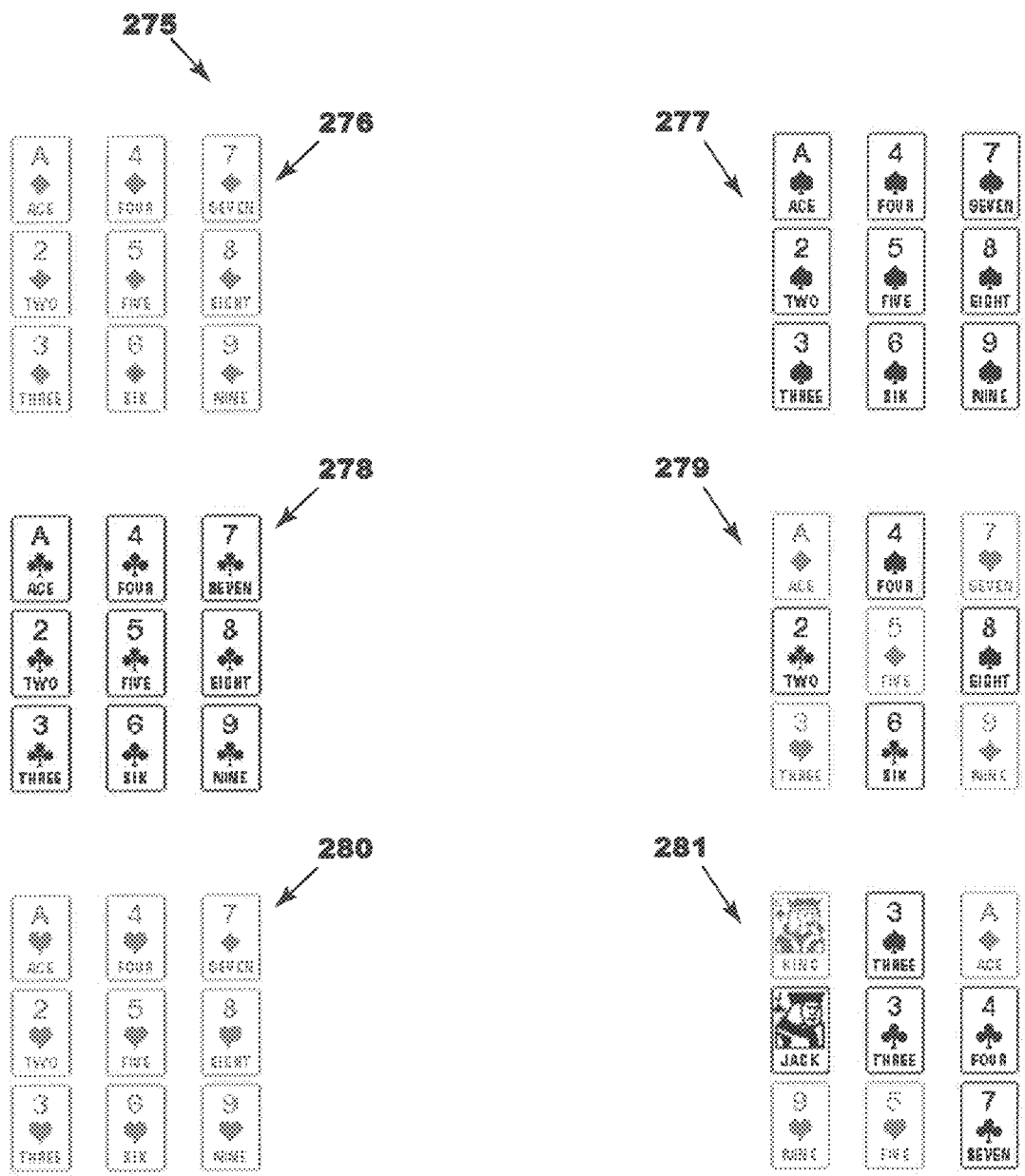
FIG. 11 is an exemplary view of the graphic output of the PostScript snippet of FIG. 9 and FIG. 10.

If the PostScript snippet of FIG. 9 and FIG. 10 were executed on the digital imager print on demand system, the resulting print output 275 could appear as illustrated in FIG. 11. As shown in FIG. 11, the printed output 275 is divided into six sets 276 through 281 of nine card indicia as specified by the first portion 225 and the second portion 250 of the PostScript snippet.

From this simple example of a PostScript snippet, it can be seen that the implementation of PostScript or a similar language not only allows for higher quality vector graphics, but also greatly aids in imager bandwidth reduction, auditing, security, and reduction in game development costs.

Bandwidth reduction is achieved via the capabilities of PostScript to define a document, specify a layout, and access different fonts or images from separate files. The relative modest amount of data required to lay out the ticket's image areas (via codes 251 and 252) and to specify what card font is placed in what location (via codes 254 through 256) by referencing font indicia from a common file allows for the data intensive indicia, display, and overprint font and graphic primitives to be stored and loaded in a common file in the imager RIP's memory to be repeatedly accessed by PostScript calls similar to the snippet example. Thus, once the image font and graphic description primitives are loaded into the RIP's memory, the specificity of each ticket to be printed is provided by the relatively small amount of data required to define the ticket in PostScript or a similar vector graphic language. The imager bandwidth reduction is achieved by initially loading the font and graphic primitives into RIP memory and then repeatedly calling these font and graphic primitives from the PostScript code uniquely for each ticket.

By defining each ticket uniquely in PostScript with font and graphic primitives as generic input data for each ticket image, auditability is greatly simplified with the added benefit of each ticket definition becoming human readable—e.g., FIG. 9 and FIG. 10. Thus, an entire press run can be audited with a separate process "reading" the PostScript, constructing virtual tickets in memory, and determining if the resultant virtual tickets are imaged within specifications. In an alternative embodiment, an audit may be conducted using the imager's RIP or other assimilated processor—where the RIP or processor's output is directed to a file instead of the physical imager. This output file would then be redirected to a separate audit process that would scan the output high-resolution raster file with Optical Character Recognition (OCR) and/or imaging detection software to determine if the ticket was imaged to specifications including prize distribution. However, the large amounts of data in this process would most likely restrict this audit to a sampling of the total press run—e.g., every fifty packs.

By executing PostScript on the imager's RIP or other ancillary processor, the image processing is performed at a logical level as close to the raster image to be printed as possible. Thus, ideally to achieve maximum theoretical security, decryption of the secure data should occur at this level. However, as previously discussed, the vast bandwidth and associated data required to maintain a continuous press run at this level could be problematic for any additional processing burdens. Standard symmetrical block cipher encryption and decryption algorithms have improved over the years from relatively processor intensive DES and 3DES (Data Encryption Standard and Triple Data Encryption Standard) to Blowfish and AES with Blowfish generally being acknowledged as requiring the least processing overhead. However, as their names imply, block ciphers can only encrypt chunks of data of a fixed length—e.g., 8, 16, 32, or 64 bits. In order to encrypt and decrypt data of arbitrary length (much less the vast amount of data required for a process color instant lottery ticket press run) the block cipher must be invoked multiple times—a.k.a. "stream cipher" or "chaining mode." Common chaining modes such as Cipher Feedback (CFB) or Counter (CTR) require a digital key and an Initialization Vector (IV) where the resulting cipher text is either feedback for the subsequent block cipher or the number of encryption counts is added to the IV on each subsequent block cipher. However, when attempting to decode a stream cipher of instant lottery ticket images, the bandwidth requirements can exceed the ability of the stream cipher decoder. For example, utilizing AES in CTR chaining mode results in a typical effective bandwidth of 100 MB/second (800 Mbps) on a 2.4 GHz Intel Core2 processor, using a single core. In comparison, as previously stated, process color imaging over a narrow web width (one foot) with a relatively slow speed (100 FPM) will require an aggregate decryption bandwidth of about 617 MB/second (about 5 Gbps), thereby overloading the example AES CTR chain mode bandwidth by over a factor of six.

With the incorporation of PostScript, a significant quantity of imager data can be eliminated from the secure portion of a lottery ticket (variable indicia) by isolating fonts and graphic primitives into separate unencrypted files and only encrypting the PostScript code that calls those files securely, thereby achieving a large reduction in decryption bandwidth requirements. In a preferred embodiment, these isolating fonts and graphic primitives unencrypted files would first be loaded in the imager RIP memory, thereby allowing for maximum bandwidth utilization of the RIP.

In view of this disclosure, one skilled in the art would appreciate that PostScript tends to be highly compressible with zero loss compression algorithms. The transmitted PostScript could also be compressed and decompressed at the time of the print run assuming sufficient bandwidth was available to perform the decompression.

In another embodiment, the secure ticket data graphical indicia (e.g., fonts, graphic primitives, etc.) are maintained in separate files with the PostScript code ticket description (i.e., variable indicia, display, overprint, ticket back) encrypted, thereby securing a ticket's winning or losing status. While this embodiment has the advantage of greatly reduced encryption and decryption bandwidth, both the secure and non-secure portions of the ticket's PostScript code is encrypted and therefore does not offer optimal bandwidth utilization. Additionally, encrypting the entire ticket's PostScript code creates challenges for auditing and potential security risks. Finally, encryption or decryption key management can become challenging, since a common encryption key and IV is required to decrypt the entire press run or at least large blocks of the press run.

Figure 12:
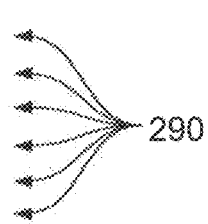
FIG. 12 is an exemplary view of an embodiment of a PostScript snippet as applied to encrypting the variable indicia font calls in the PostScript snippet of FIG. 10.

In an alternative embodiment, the portions of the PostScript code only associated with secure variable indicia are isolated for encryption and decryption resulting in a further reduction in encryption and decryption bandwidth. Ideally, this encryption isolation could be limited to the calls to the secure ticket data graphical variable indicia (e.g., fonts, graphic primitives, etc.). FIG. 12 provides an example of this embodiment of a PostScript snippet 250' by illustrating the snippet of FIG. 10 with its calls to secure ticket data graphical variable indicia via code 256' (FIG. 12) encrypted via code or calls 290. As shown in FIG. 12, the encrypted calls 290 to secure ticket data graphical variable indicia via the code 256' constitute a small portion of the overall PostScript code, effectively leaving the snippet readable (e.g., for auditing and debugging purposes) while at the same time reducing decryption bandwidth and ensuring the security of the imaged variable indicia.

Encryption and decryption of this embodiment could be achieved with a block cipher assuming the secure ticket data graphical variable indicia calls were designed to ensure that their length never exceeded the block cipher size—e.g., 16 bits. This would have the added security advantage of readily accommodating encryption and decryption rekeying on any periodic basis—e.g., by pool, by pack, or even by ticket. The multiple encryption and decryption keys are kept in separate files that could remain encrypted until needed.

As previously stated, to enhance security the decryption process should be pushed down to as close as possible as a logical level to the actual image. Thus, in a preferred embodiment, the imager RIP would be the processor performing the decryption of the secure ticket variable indicia. However, imager RIPs are typically not utilized for decryption. Fortunately, it is possible to implement one time pad decryption within PostScript code, such that the RIP will automatically decrypt the secure variable indicia ciphertext as part of its normal image processing.

Major Joseph Mauborgne and Gilbert Vernan invented the one-time pad encryption scheme in 1917. It has been mathematically proven that one-time pads are the perfect encryption scheme—i.e., impossible to break without the shared one-time pad key, see: "Communication Theory of Secrecy Systems" in Bell Labs Technical Journal 28 (4): 656-715 by Claude Shannon, circa 1945. One time pads remain secure so long as the encryption key is truly random, is never used again, and is the same length as the plaintext. In other words, a random key sequence added to a nonrandom plaintext message produces a completely random ciphertext message. Since every decrypted plaintext data is equally possible there is no way for a cryptanalyst to determine which plaintext data is the correct one.

Since one time pads simply combine a random string of data with the plaintext data, computation of one time pad encryption or decryption requires very little overhead and will only add a trivial burden to the processor, especially if encryption and decryption is confined to just the encrypted calls 290 (FIG. 12) securing ticket data graphical indicia via code 256'. FIG. 13 provides an example of PostScript code 300 implementing the preferred embodiment of one time pad encryption and decryption. In the example, an input string of clear text data 301 ("datain") is defined, as well as a one time pad key 302 ("datakey" or "encryption key") of the same length. The cleartext data text string 311 in FIG. 14, "Now is the time for all good men to come to the aid of their country" is only for illustrative purposes. In the actual implementation, the calls 290 securing ticket data graphical indicia via code 256' (FIG. 12) or a separate file containing the calls or other data would comprise the cleartext to become encrypted. Returning to FIG. 13, the cleartext 301 and encryption key 302 are one time pad encrypted and decrypted by code 303 with the resulting ciphertext 310 (FIG. 14) and decrypted cleartext strings 311 dumped. It should be noted that even though the example 300 of FIG. 12 illustrates both one time pad encryption and decryption via PostScript, the actual encryption process could be conducted outside of PostScript.

Based on the present description, it would be apparent to one skilled in the art that one time pad encryption or decryption can be implemented in processors other than the imager's RIP; however, these processors are logically further removed from the imager and consequently, typically less desirable. In other applications and embodiments of the invention, (e.g., secure electronic gambling game played on a computer or handheld personal device), encryption and decryption via PostScript may efficiently and securely execute on processors other than a RIP, thereby enabling secure documents or interactive experiences to be generated for different consumers in varying circumstances. As used herein, the term "personal device" means any handheld device, such as a smartphone type of cell telephone that contains sufficient computing power and applications to allow a person to play games, a tablet computer, a combination tablet and laptop computer, or the like.

Traditionally, one of the biggest technical challenges of implementing one time pad encryption is generating a truly random key, used only once, that is the same length as the cleartext data. This is particularly challenging for encryption of instant lottery ticket secure variable indicia calls given the vast number of tickets printed. In one embodiment, the one time pad key could be generated with Linear Congruential Generator (LCG) or Mersenne Twister algorithms using secret starting seeds. However these types of algorithms are Pseudo Random Number Generators (PRNG) and not truly random and consequently not necessarily secure against cryptanalyst attacks. An alternative embodiment would be to encrypt portions of the ticket data using AES in CFB or CTR with the resulting ciphertext stream becoming the one time pad key. Again, this is another PRNG process and consequently not necessarily secure, though arguably more secure against cryptanalyst attacks than the first embodiment. In a preferred embodiment, a True Random Number Generator (TRNG) hardware device, such as the Dallas Semiconductor DS5250 cryptographic microprocessor, creates the one time pad key. Hardware TRNGs provide a virtually infinite source of random numbers generated in secure systems with tamper resistant packaging and signed (i.e., authenticated) RNG output.

Whichever embodiment is employed to generate the one time pad key, the resulting key stream should be divided into discrete units of pools, packs, or tickets. By dividing the one time pad keys into discrete units, the keys can be released to the imager on a "need to know" basis (i.e., when required for printing), thereby minimizing exposure in potentially less secure distributed printing facilities. It is preferable to encrypt the one time pad key files with a separate process (e.g., AES) using separate secondary keys for added security. Decryption of these one time pad key file discrete units would most likely occur on a processor other than the RIP, but ideally would be as logically close to the RIP as possible.

Figure 15:
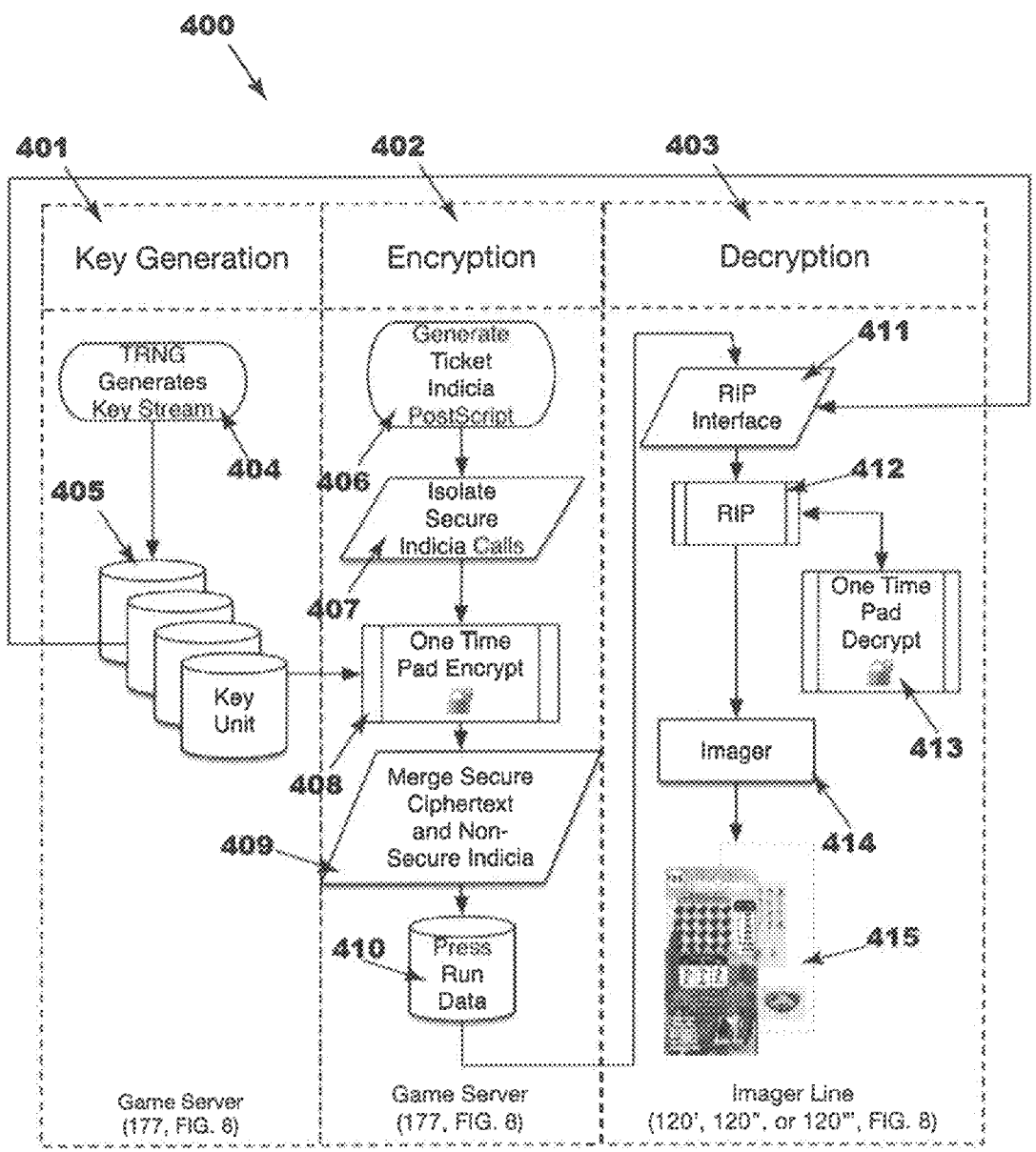
FIG. 15 is a vertical swim lane flowchart providing a graphical overview of a first embodiment utilizing the digital imager RIP for decryption of secure variable indicia.

FIG. 15 is a vertically oriented "swim lane" flowchart 400 that illustrates an exemplary embodiment of a one time pad encryption and decryption system enabling an imager RIP to decrypt the secure variable indicia for instant lottery tickets. Similar to the previous flowcharts, the flowchart of FIG. 15 has key generation 401, encryption 402, and decryption 403 conceptually divided into three categories where key generation 401 and encryption 402 are performed by game programming and decryption 403 is executed by the RIP processor at steps 412 and 413 associated with the local or distributed imager of step 414.

The embodiment of flowchart 400 starts with a TRNG at step 404 generating the random number key stream with the output being logically subdivided into multiple key units 405—e.g., tickets, packs, pools, etc. In a parallel process, the ticket indicia (i.e., both secure and non-secure portions) are generated at step 406 for the game with the secure indicia being isolated for encryption at step 407. The resulting isolated secure indicia are then one time pad encrypted at step 408 with the TRNG unit key in whichever level of quantization was specified for the key units 405. The resulting secure portion ciphertext output is then merged with the cleartext non-secure portion at step 409 with the resulting secure press run data file generated at step 410. The secure press run data file at the step 410 is then transmitted to the imager line area's RIP interface processor 403 that also receives the encrypted key units' ciphertext. The press run data file at the step 410 is then forwarded to the RIP at step 412 along with the associated decrypted key units 405 necessary for the ticket being imaged at the time. The RIP at the step 412 then executes the PostScript code to decrypt the secure indicia at step 413 utilizing the appropriate cleartext key unit(s).

A checksum or Cyclic Redundancy Code (CRC) can be included in the secure ciphertext thereby allowing for a conformation that the resulting cleartext indicia calls decrypted correctly. Alternatively, a checksum, CRC, or secure hash of the decrypted indicia could be stored in the cleartext (i.e., not secured) portion of the PostScript code, thereby allowing the same type of successful decryption conformation of the indicia. However, this embodiment potentially exposes a method to deduce the decoded secure indicia from the cleartext checksum or CRC.

Returning to FIG. 15, the resulting secure cleartext is used to call the appropriate win or lose indicia in the image being generated by the RIP at the step 412, which is then internally fed to the imager at step 414. The resulting imaged instant lottery tickets 415 thereby include imaging from both the secure and non-secure portions of the ticket data.

Another advantage of PostScript implantation for production of instant lottery tickets is cost savings in the game programming process. Traditional IJPDS instant lottery ticket production requires indicia to be created for specific games with the symbols packed into 8-bit character locations unique for a game. With higher resolution imagers accepting PostScript it becomes possible to create a vector graphics library of graphical images that can be used repeatedly from game to game with a subsequent reduction in game development costs.

With PostScript it becomes possible to generate glyph indicia. The advantage of a glyph is that the game generation program does not need to be cognizant of the location or even the method the glyph indicia is defined, rather glyph indicia are defined in a dictionary prior to printing with a logical name to identify the symbol, rather than a cryptic font location number limited to a range—e.g., 0-255.

Figure 18:
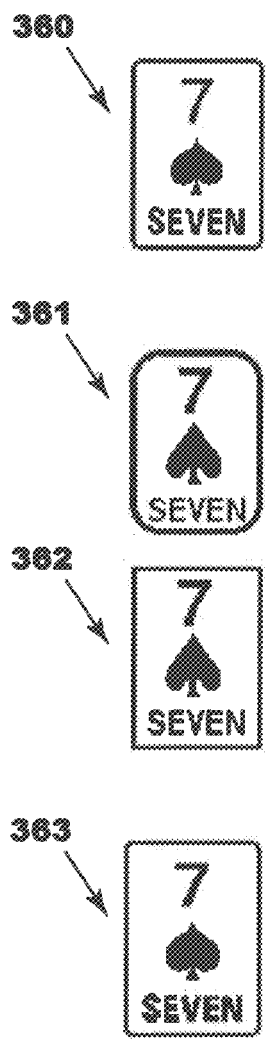
FIG. 18 is an exemplary view of the graphic output of the PostScript glyph snippets of FIG. 16 and FIG. 17.

For example, FIG. 16 and FIG. 17 provide PostScript snippets 325 and 350, respectively, that execute four macros 327, 328, 329 (FIG. 16), and 351 (FIG. 17), generating the corresponding four glyph indicia 360 through 363 of FIG. 18. The four macros 327, 328, 329 and 351 each uses a different glyph generation technique resulting in differing glyph indicia 360 through 363 of FIG. 18. Macro 327 (7sOneFont) resulting in glyph 360 draws the 7 of spades using a single character from a standard PlayingCards font. Macro 328 (7sMultiFont) resulting in glyph 361 draws the 7 of spades using multiple fonts: the outline uses six characters from a Border font, both the numeral "7" and the word "SEVEN" are derived from the Helvetica Bold font, and the spades symbol is derived from the Symbols font. Macro 329 (7sMixed) resulting in glyph 362 is similar to macro 328 with the exception that vector graphic data is utilized the card outline with the remainder drawn in a process identical to macro 328. Finally, macro 351 (7sVector) resulting in glyph 363 draws the entire 7 of spades indicia using vector graphic data per codes 352 and 355—the illustrated listing of vector graphic data is abbreviated (identified by ellipsis 354) to allow the figure to fit on one page.

With all four macros (327, 328, 329, and 351) of the previous example, the 7 of spades indicia are defined as glyphs with logical names. This in turn allows for a level of abstraction enabling specified indicia to be dynamically defined (e.g., "/7s {7sOneFont} def", "/7s {7sVector} def", etc.) allowing the glyph indicia to be algorithmically selected for game generation or special purposes (e.g., void symbols could be substituted for sample tickets).

In a general embodiment, the game generation software would algorithmically select the referencing of glyph indicia. In this embodiment, specific glyph indicia would be generated once and thereafter available for multiple games. In a preferred embodiment, the glyph indicia would be comprised of vector graphics using geometrical primitives such as points, lines, curves, and shapes or polygons all of which are based on mathematical expressions—to represent images. Consequently, vector graphics are preferred since they can be modified (e.g., magnified, reduced, skewed, etc.) without loss of quality, and therefore adaptable for usage from game to game. In addition to visual variety, this modification capability can also be used to enhance immunity to pinprick attacks on instant lottery tickets where very small portions of the SOC are removed in attempt to discern winning variable indicia without having the ticket appear to be tampered with. By changing at least one parameter (e.g., magnification, skew), with vector graphics, the resulting printed winning variable indicia's overall look and characteristics can be modified with their corresponding susceptibility to pin prick attacks greatly reduced.

Another cost reduction is realized by enabling conversion and un-conversion (i.e., converting and un-converting the generated lottery ticket win or lose data to or from digital imaging) controlled by a parameter driven system with associated art files. With this embodiment, fixed game generation software produces both the secure and non-secure portions of instant lottery ticket imaging with a separate parameter file controlling the entire game generation process. This parameter file would reference glyph indicia stored in a common lexicon with the layout of each ticket defined in output PostScript files (e.g., the snippet 225 of FIG. 9 and the snippet 250 of FIG. 10). There are numerous advantages to this embodiment in addition to cost savings. Principally, the reuse of a common game generation engine from game to game reduces the potential for errors both from a programming and computational standpoint. Additionally, having a parameter file controlling the generation process greatly reduces the labor and complexity associated with auditing.

Yet another efficiency is achieved by varying imaging to accommodate pack activation, shipping, display cards, etc. inline with instant lottery ticket production. With current production such items as pack activation cards (i.e., special cards with barcodes that when scanned inform the lottery central site system that the pack has been received by the retailer and the associated tickets are now on sale so that redemptions will be honored) or other similar types of specialized cards or documents (e.g., shipping labels, display cards, etc.) are inserted on top of each pack prior to shrink wrapping. This insertion process necessitates extra labor and is a potential source of error. However, with current instant ticket production using fixed plate printing for the ticket display etc., printing of these types of specialized cards or documents during the press run is not practical. Additionally, insertion of these types of specialized cards or documents in a distributed printing environment is particularly more problematic, since the personnel located over the distributed and geographically diverse areas would necessarily have to be instructed of the particulars of card or document insertion for each press run. Finally, the existing technique of fixed plate display printing makes it economically impractical to offer small runs of semi-customized tickets targeted for particular stores or chains (e.g., "7-Eleven Scratch", "Circle K Winners", etc.) with the printing and logistics of separating these semi-customized tickets and directing them to their intended sales outlets daunting at best.

Fortunately, with the printing on demand of tickets variability of the disclosed instant lottery ticket imager distributed processing systems, it becomes possible not only to vary tickets, but also to insert specialized cards or documents directly into the imaged stream of produced tickets. This automated variable imaging and insertion capability thereby reduces labor and packaging customization over both local and distributed printing environments, and also enables small runs of semi-customized tickets targeted for particular stores or chains with destination address cards being printed inline during the imaging process.

Figure 19:
FIG. 19 illustrates two examples of inline ticket channels with pack activation cards simultaneously imaged during the printing process.

FIG. 19 illustrates two examples of inline ticket channels 425 and 426 with pack activation cards simultaneously imaged during the printing process. In embodiment of channel 425, a pack activation card 427 has the same dimensions as the tickets in the channel. The pack activation card 427 also includes the necessary activation barcode 428 customized for its associated pack. Since the pack activation card 427 is the same height as the tickets in the channel, a standard rotary mechanical perforation wheel with teeth can be utilized to stamp the periodic perforations 431 (three occurrences in the channel 425), allowing the tickets and activation card to be individually torn and separated by the retailer at the time of sale.

In another embodiment, the channel 426, a pack activation card 429 and associated barcode 430 are still imaged in the same inline channel with the tickets. However, in the preferred embodiment the perforations 432 (three occurrences in the channel 426) are no longer stamped by a mechanical rotary wheel, but are created by a laser that vaporizes portions of the ticket channel to create the spaces between the perforations. This embodiment has the advantage of enabling variable sized cards, documents or tickets to be imaged in the same channel, as well as enabling variable option custom shape cutting. Suitable inline laser cutters are manufactured by SSEWorldwide and Preco Inc.

While the previously unknown efficiencies of the disclosed inventions both reduce cost and enhance the ticket or document's appearance, there remains the problem of traditional instant ticket production systems transitioning to these new methods in an efficient and low risk manner that is as practical as possible. This transition process is especially challenging, in consideration that the owners and operators of traditional instant ticket systems are risk adverse and the traditional systems are relatively stable, having gradually evolved to their present state over decades.

Fortunately, by including middleware that converts present lottery production standard imager in non-vector raster format (IJPDS) variable indicia data to PostScript or some other vector printing language executable on modern RIPs (e.g., Xitron's Navigator Harlequin RIP), it becomes possible to generate high-quality color coordinated images of lottery ticket unsecure variable indicia, display, overprint, and back with the secure variable indicia win-lose pseudorandomly distribution determined by the existing tried and true systems that have been used over decades. Thus, in this embodiment, the traditional game generation software would be utilized to assign prizes to tickets throughout a print run referencing variable indicia in a traditional manner. After the traditional game generation process is completed, the necessary audits conducted, and the traditional shuffle implemented to distribute prizes among the print run, the resulting non-vector raster file(s) would be processed by a middleware interpreter that would convert the primitive IJPDS variable indicia to PostScript or some other vector language by substituting each IJPDS variable indicia with corresponding vector graphic variable indicia. In addition to variable indicia graphics substitution, the middleware interpreter would also extract positioning data from the IJPDS file(s) and dutifully place the substituted vector graphic in the same relative position on the tickets.

Figure 20:
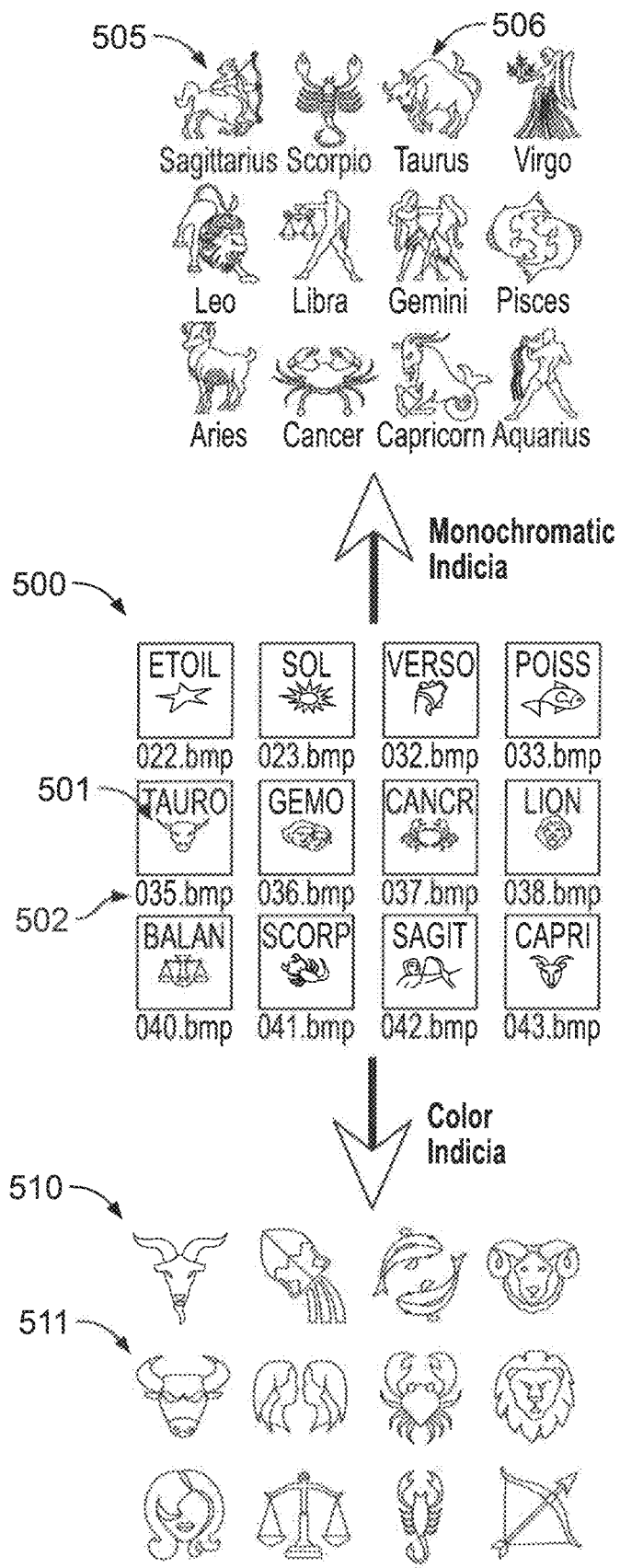
FIG. 20 is an exemplary view of a representative example of typical IJPDS variable indicia mapped to associated vector graphic variable indicia.

Due to the limited amount of data contained in traditional IJPDS ticket files (i.e., typically no more than 12K bytes per document), the problems associated with creating a general-purpose middleware interpreter to vector graphics are minimized. Since traditional IJPDS ticket files contain only monochromatic indicia typically at 240 dpi, the inputs to the middleware interpreter typically are limited to the variable indicia itself and their location with each of the variable indicia typically being embodied as a small bitmap file assigned a sequential number. For example, FIG. 20 illustrates typical IJPDS variable indicia 500 as a set of separate bitmap files (e.g., graphical data 501 with names 502) that can be transformed by the middleware interpreter to either monochromatic vector graphics 505 and 506 or process color vector graphics 510 and 511 depending on the specification of the ticket's appearance.

This is not to imply that the middleware interpreter must always change the appearance of the traditionally generated non-vector raster variable indicia. In some embodiments it may be desirable to replicate the exact appearance of traditional indicia (e.g., traditional ticket re-orders) printed with modern vector graphics utilizing full color digital imagers. In these embodiments, the middleware would translate the traditionally generated non-vector raster variable indicia into vector graphics executable on modern RIPs and imagers (e.g., Memjet, HP, Xerox); however, these vector graphics would be a literal interpretation of traditional monochromatic 240 dpi variable indicia resulting in a 1:1 interpretation of the traditional ticket, but with vector graphics variable indicia and possibly full color display and overprints.

Figure 21:
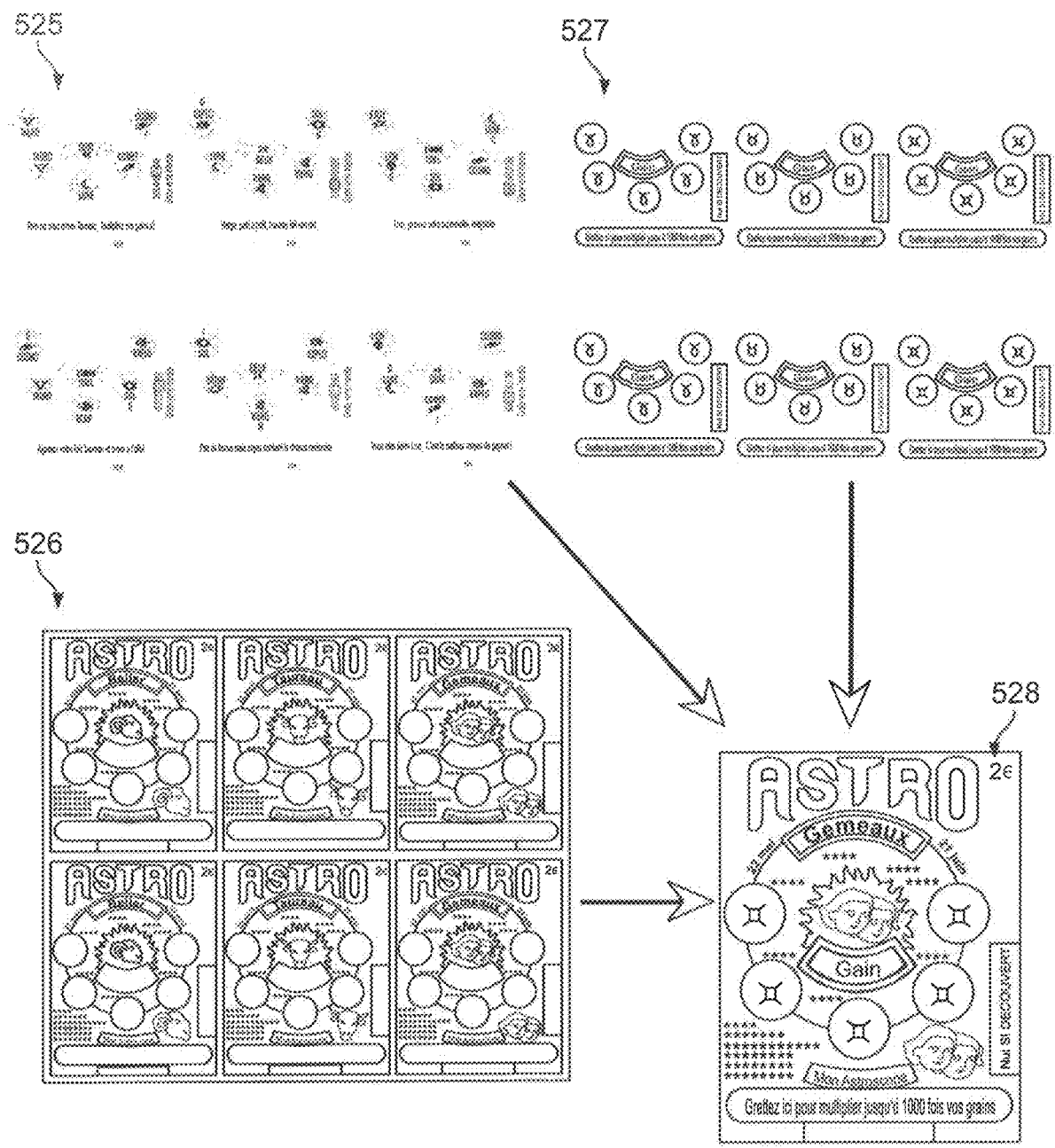
FIG. 21 is an exemplary view of a representative example of typical IJPDS secure variable indicia mapped to associated vector graphic non-secure variable indicia as well as display and overprint.

In addition to variable indicia digital imaging, the middleware interpreter could also access separate display vector graphics digitally overlaying the converted vector graphic variable indicia with the appropriate non-secure vector graphics display. If any traditional non-secure variable indicia (e.g., inventory control barcode, human readable number) are to be imaged, typically on the back of the ticket, the middleware would also convert these variable indicia to vector graphics again digitally overlaying the ticket back variable indicia with the other backing vector graphics (e.g., legal text, universal product code barcode). After the digital overlay is complete, the middleware would also access the vector graphics associated with the overprint, thereby integrating the overprint with the display and ticket backing imaging. In an alternative embodiment, the middleware would convert the secure variable indicia to vector graphics exclusively for printing on one imager. In this embodiment, the middleware would also access the vector graphics for the combined display and overprint as well as the ticket back. While not essential, it is preferable that the middleware not only convert the traditionally generated IJPDS variable indicia into vector graphics but also control the display, overprint and ticket backing. Thus, in the event that a ticket's display, overprint, or backing are somehow related to game play or the prize value, the same middleware application can ensure synchronization between all components of the ticket. For example, FIG. 21 symbolically illustrates the middleware interpreter accepting the IJPDS secure variable indicia data 525, overlaying it with the unsecure associated display vector graphics 526, as well as the unsecure linked overprint vector graphics 527 to produce a composite vector graphics image ticket 528. Thus, in this example, the middleware used for the printed ticket 528 would coordinate the display 526 and overprint 527 with the secure variable indicia 525, where winners were determined when the display 526 and overprint are the same astrological symbol as the variable indicia 525.

Figure 22:
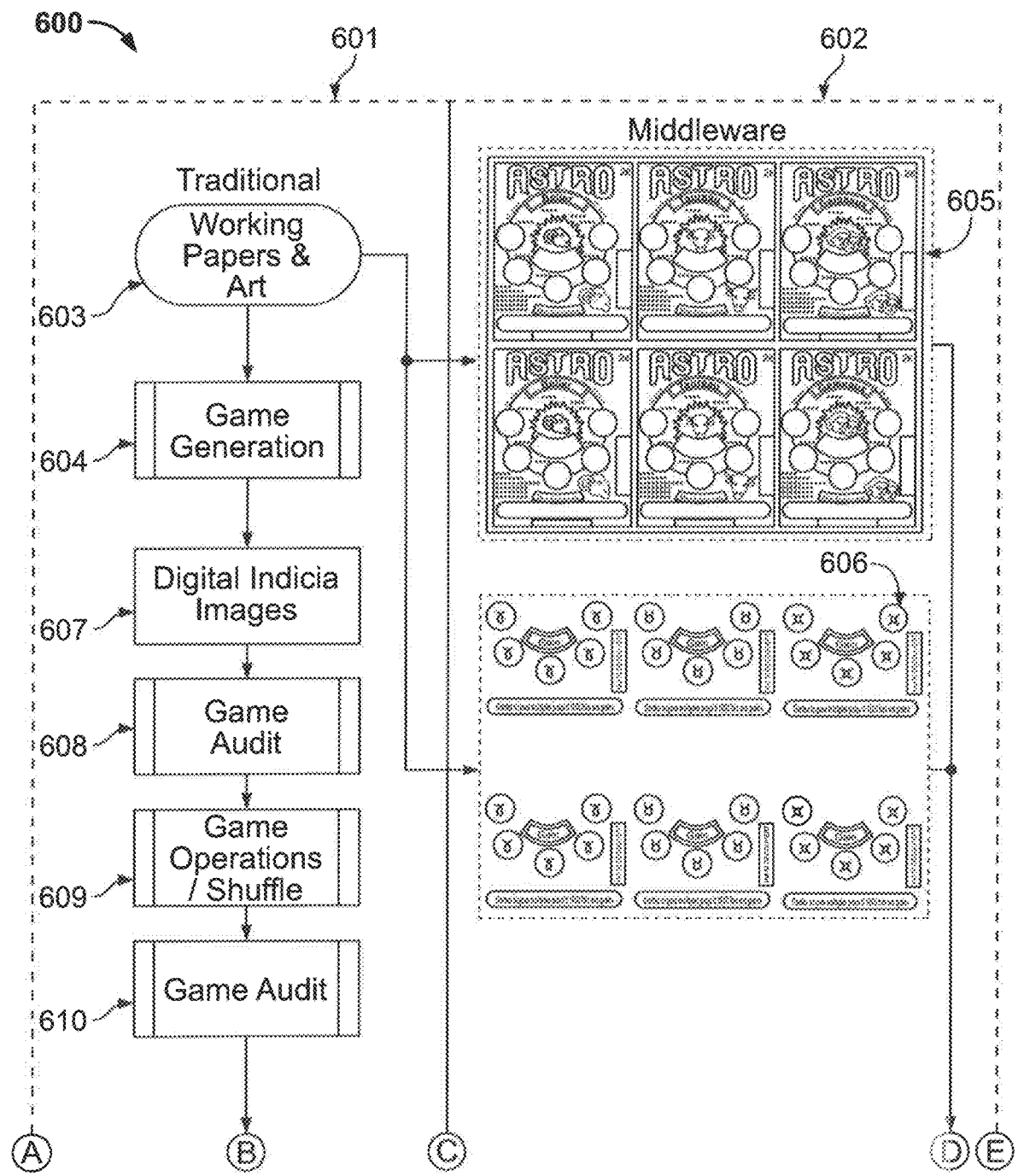
FIG. 22 is a block diagram providing a schematic graphical overview of a middleware interpreter capable of producing the embodiments of FIG. 20 and FIG. 21.
Figure 22:
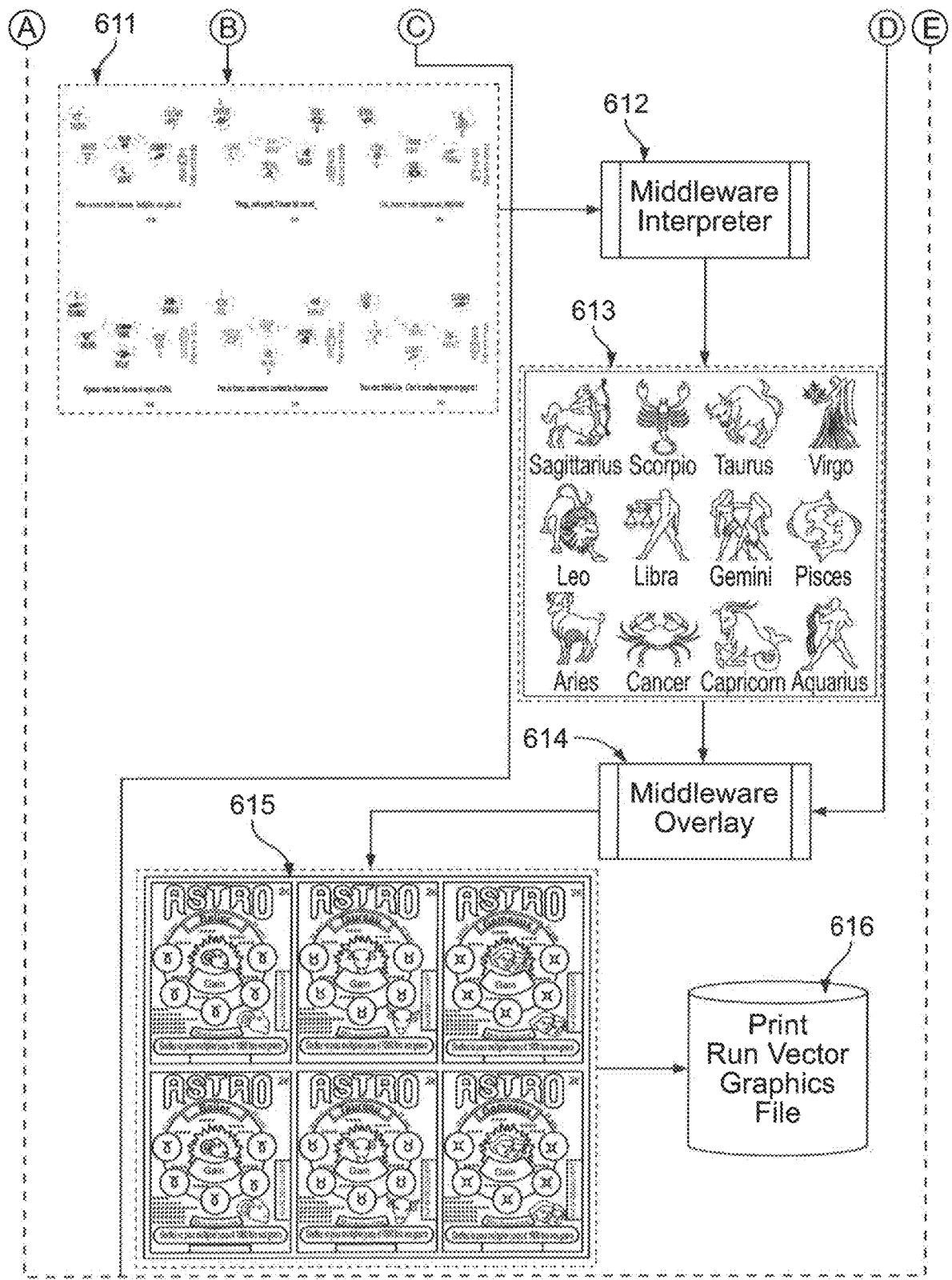

FIG. 22 illustrates an example of a middleware system vertical swim lane flowchart integrated to a traditional instant ticket generation system 600. Similar to the description above, the system 600 is conceptually divided into two groups, namely a traditional production or system 601 and a middleware production or system 602 by the two swim lane columns on the left and right, respectively. If a particular flowchart function appears completely within a swim lane its functionality is limited to the category of the associated swim lane—e.g., a game generation function at a step 604 is exclusively part of traditional ticket production 601.

Integration of the middleware system 602 with traditional instant ticket production 601 begins with creating a specification and associated artwork 603 (also called "working papers") defining the game and ticket layout. Once created and agreed upon by all involved parties, the working papers 603 are used to specify the game generation software 604 that will determine which tickets win, as well as how the game secure variable indicia appears on the tickets. Additionally, ticket display 605, backing and overprints 606 are also specified by the working papers.

The traditional system 601 game generation software 604 accepts variable indicia artwork symbols and constructs the layout of each ticket to ultimately securely distributing winning and losing tickets pseudorandomly for the pending print run within the specifications of the working papers 603. At the same time, the middleware system 602 receives non-secure artwork (e.g., the display 605, ticket back and overprints 606) and assimilates the artwork into its database for inclusion in tickets to be imaged in the pending print run. As shown in FIG. 22, the non-secure imager artwork (represented by the display 605 and the overprints 606) is maintained in the middleware system 602 separate from the secure variable indicia artwork, which is maintained by the traditional game generation software 604. This parallel path does not exist with current instant lottery ticket production, since non-secure artwork is printed via analog fixed plates and not by digital imagers.

Once the game generation software 604 is completed in the traditional system 601, digital images are generated at a step 607 for internal audit purposes at a step 608. The audit is performed to ensure compliance with the working papers generated at the step 603 including number and distribution of winners and losers, graphics, etc. Assuming the audit is successful, the resulting winning and losing tickets are securely shuffled at a step 609 for placement throughout the print run. After the shuffle is completed, a second audit is conducted at a step 610 on voided portions of the resulting print run to ensure that the imaging is within the working papers' specifications. Assuming the second audit is successful, the traditional production 601 concludes with a generated IJPDS variable indicia file 611 being passed to a middleware interpreter 612.

A middleware interpreter 612 analyzes the traditional IJPDS file 611 extracting all variable indicia calls, as well as any related parameters (e.g., location on the ticket). This extracted data are compiled on a ticket-by-ticket basis with the variable indicia of the traditional IJPDS file 611 being swapped for associated vector graphic variable indicia 613. Once this process is completed for every ticket in the print run, the non-secure vector graphic art 605 and 606 is referenced by the middleware and overlaid at a step 614, with the translated secure vector graphics variable indicia resulting in a series of composite vector graphic ticket images 615 containing all imager data. These composite vector graphic ticket images 615 can be utilized by one or more RIPs to produce complete tickets during the print run. This series of composite vector graphic ticket images 615 is then stored by the middleware in one or more files at a step 616 for use during ticket production by the RIP(s).

It should be appreciated by those skilled in the art in view of this description that various modifications and variations may be made present invention without departing from the scope and spirit of the invention. It is intended that the present invention include such modifications and variations as come within the scope of the appended claims.

What is claimed is:

1. A system comprising:
a processor;
a non-transitory computer-readable medium storing program code, the program code executable by the processor to cause the system to:
receive, in a non-vector graphic format, a set of secure variable indicia of a scratch-off-coating protected document to be printed, wherein each of the set of secure variable indicia are assigned a location on the document;
generate a set of vector graphics;
link each of the set of secure variable indicia to a vector graphic in the set of vector graphics;
generate a composite vector graphic image utilizing the set of vector graphics based, at least in part, on the location assigned to each of the set of secure variable indicia; and transmit the composite vector graphic image for printing on the document.

2. The system of claim 1, further comprising program code to:
   receive, in non-vector graphic format, non-secure variable indicium of the document;
   generate a first vector graphic based, at least in part, on the non-secure variable indicium; and
   modify the composite vector graphic image to further include the first vector graphic.

3. The system of claim 2, wherein the first vector graphic overlaps a portion of the set of vector graphics in the composite vector graphic image.

4. The system of claim 1, wherein the set of secure variable indicia and the locations for the set of secure variable indicia are generated by non-vector game generation software.

5. The system of claim 1, wherein the set of vector graphics are generated using PostScript language.

6. The system of claim 1, wherein the document is a lottery ticket.

7. The system of claim 1, wherein the program code to generate the set of vector graphics comprises program code to translate a first indicium of the set of secure variable indicia to a vector graphic format without visually modifying the first indicium.

8. The system of claim 1, wherein the program code to generate the set of vector graphics comprises program code to select fonts and glyphs from a database to represent a first indicium of the set of secure variable indicia.

9. The system of claim 1, wherein the set of vector graphics comprises monochromatic indicia.

10. The system of claim 1, wherein the set of vector graphics comprises process color indicia.

11. A method comprising:
    receiving, in a non-vector graphic format, a set of secure variable indicia of a scratch-off-coating protected document to be printed, wherein each of the set of secure variable indicia are assigned a location on the document;
    generating a set of vector graphics;
    linking each of the set of secure variable indicia to a vector graphic in the set of vector graphics;
    generating a composite vector graphic image utilizing the set of vector graphics based, at least in part, on the location assigned to each of the set of secure variable indicia; and
    transmitting the composite vector graphic image for printing on the document.

12. The method of claim 11, further comprising:
    receiving, in non-vector graphic format, non-secure variable indicium of the document;
    generating a first vector graphic based, at least in part, on the non-secure variable indicium; and
    modifying the composite vector graphic image to further include the first vector graphic.

13. The method of claim 12, wherein the first vector graphic overlaps a portion of the set of vector graphics in the composite vector graphic image.

14. The method of claim 11, wherein the set of secure variable indicia and the locations for the set of secure variable indicia are generated by non-vector game generation software.

15. The method of claim 11, wherein the set of vector graphics are generated using PostScript language.

16. The method of claim 11, wherein the document is a lottery ticket.

17. The method of claim 11, wherein generating the set of vector graphics comprises translating a first indicium of the set of secure variable indicia to a vector graphic format without visually modifying the first indicium.

18. The method of claim 11, wherein generating the set of vector graphics comprises selecting fonts and glyphs from a database to represent a first indicium of the set of secure variable indicia.

19. The method of claim 11, wherein the set of vector graphics comprises monochromatic indicia.

20. The method of claim 11, wherein the set of vector graphics comprises process color indicia.

* * * * *